US012495187B2

(12) United States Patent
Finc et al.

(10) Patent No.: US 12,495,187 B2
(45) Date of Patent: *Dec. 9, 2025

(54) SYSTEMS, APPARATUS, AND RELATED METHODS TO ESTIMATE AUDIENCE EXPOSURE BASED ON ENGAGEMENT LEVEL

(71) Applicant: The Nielsen Company (US), LLC, New York, NY (US)

(72) Inventors: Matjaz Finc, Izola (SI); Igor Sotosek, Portoroz (SI)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/789,331

(22) Filed: Jul. 30, 2024

(65) Prior Publication Data

US 2024/0414400 A1  Dec. 12, 2024

Related U.S. Application Data

(63) Continuation of application No. 17/896,896, filed on Aug. 26, 2022, now Pat. No. 12,088,882.

(51) Int. Cl.
*H04N 21/466* (2011.01)
*H04N 21/442* (2011.01)

(52) U.S. Cl.
CPC ... *H04N 21/4667* (2013.01); *H04N 21/44218* (2013.01)

(58) Field of Classification Search
CPC ......... H04N 21/44218; H04N 21/4788; H04N 21/41265; H04N 21/4223; H04N 21/44224; H04N 21/44204; H04N 21/44222; H04N 21/4667
USPC .............................................. 725/46
See application file for complete search history.

(56) References Cited

U.S. PATENT DOCUMENTS

| | | | |
|---|---|---|---|
| 11,272,254 B1* | 3/2022 | Paran | H04N 21/4826 |
| 2003/0070182 A1* | 4/2003 | Pierre | H04N 21/4325 725/135 |
| 2004/0036596 A1* | 2/2004 | Heffner | G08B 13/19658 379/39 |
| 2006/0242715 A1* | 10/2006 | Mrazovich | H04M 1/72502 726/35 |
| 2009/0141117 A1* | 6/2009 | Elberbaum | H04N 7/186 348/14.04 |
| 2013/0147623 A1* | 6/2013 | Somasundaram | H04N 21/43615 726/4 |

(Continued)

*Primary Examiner* — Cynthia M Fogg

(57) ABSTRACT

Methods, apparatus, and systems are disclosed for estimating audience exposure based on engagement level. An example apparatus includes at least one memory, machine readable instructions, and processor circuitry to at least one of instantiate or execute the machine readable instructions to identify a user activity associated with a user during exposure of the user to media based on an output from at least one of a user device, a remote control device, an image sensor, or a motion sensor, classify the user activity as an attention-based activity or a distraction-based activity, assign a distraction factor or an attention factor to the user activity based on the classification, and determine an attention level for the user based on the distraction factor or the attention factor.

18 Claims, 15 Drawing Sheets

(56) References Cited

U.S. PATENT DOCUMENTS

| | | | |
|---|---|---|---|
| 2015/0070495 A1* | 3/2015 | Scalisi ................... | H04N 7/188 340/6.1 |
| 2016/0027262 A1* | 1/2016 | Skotty .............. | G08B 13/19632 340/541 |
| 2018/0052840 A1* | 2/2018 | Scott ................... | H04L 12/1831 |
| 2022/0312071 A1* | 9/2022 | Devaraj ........... | H04N 21/44218 |

* cited by examiner

SYSTEMS, APPARATUS, AND RELATED METHODS TO ESTIMATE AUDIENCE EXPOSURE BASED ON ENGAGEMENT LEVEL

CROSS-REFERENCE TO RELATED APPLICATION(S)

This disclosure is a continuation of U.S. patent application Ser. No. 17/896,896, now U.S. Patent No. 12,088,882, filed Aug. 26, 2022, which is hereby incorporated by reference herein in its entirety. Priority to U.S. patent application Ser. No. 17/896,896 is hereby claimed.

FIELD OF THE DISCLOSURE

This disclosure relates generally to audience tracking, and, more particularly, to systems, apparatus, and related methods to estimate audience exposure based on engagement level.

BACKGROUND

Media providers as well as advertising companies, broadcasting networks, etc., are interested in viewing behavior of audience members. Media usage and/or exposure habits of audience members in a household can be obtained using a metering device associated with a media presentation device.

BRIEF DESCRIPTION OF THE DRAWINGS

The figures are not to scale. In general, the same reference numbers will be used throughout the drawing(s) and accompanying written description to refer to the same or like parts.

Figure 1:
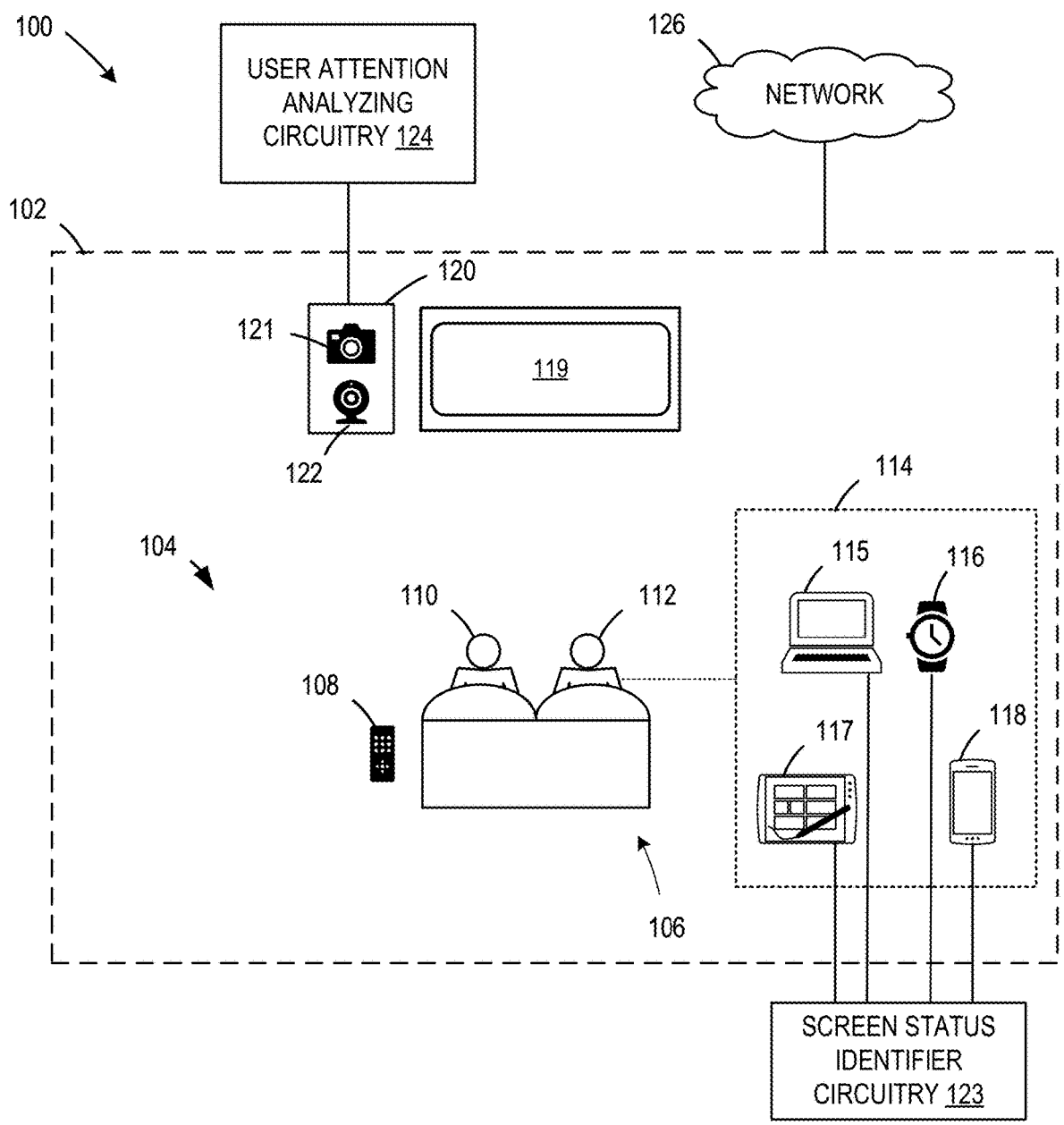
FIG. 1 illustrates an example audience monitoring system including an example metering device and user attention analyzing circuitry for verifying audience engagement with media content in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

There is a desire to monitor behavior of users of a media presentation device, such as a television, to verify user attention during operation of the media presentation device and, thus, exposure to (e.g., viewing of) content presented by the media presentation device. Audience measurement entities can perform television audience measurements using a television audience measurement (TAM) meter to track the content a user (e.g., audience member) chooses to access (e.g., television programs a user chooses to watch) and corresponding audience demographics associated with the presented content. Such information can be used to, for example, schedule commercials to optimize television content exposure to a target audience.

In some known examples, users (e.g., audience members) of a media presentation device such as a television are prompted to enter viewing panel information (e.g., user identification information) at predefined intervals during the presentation of media content using a TAM remote control. However, upon registering and/or entry of viewing panel information, there may be no additional measure of attention that the user is giving to the content presented on, for example, a screen of the media presentation device (e.g., a television). Yet the user may engage in other activities during presentation of the media content, causing the user's attention level with respect to the media content to vary over the duration of the content viewing period. Put another way, despite the presence of the user relative to the media presentation device while content is presented on the device, the user may be distracted. For example, within the media content viewing period, a user may engage in activities using other user device(s), such as typing a text message on his or her smartphone while the content is presented via a television. In some examples, the user may walk away from the media presentation device, turn his or her head away from the media presentation device, etc. As such, viewer registration alone may not accurately reflect the user's attention to the media content over the duration for which the content is presented.

Example systems, methods, apparatus, and articles of manufacture disclosed herein monitor an audience member's attention relative to content presented on a media presentation device by accounting for user activity associated with user movement and/or user device usage (e.g., a smartphone, an electronic tablet, a wearable device such as a smartwatch, etc.) identified (e.g., detected, predicted) during presentation of the content. In examples disclosed herein, attention indicators can be synchronized with viewing timelines recorded by the TAM meter. Examples disclosed herein identify changes a panelist's engagement with content over time. In some examples, different distraction factors are identified based on varying attention indicators associated with user activities. For example, television remote control usage by the user can be indicative of attention because the user is likely viewing the television screen while using the remote to select content for view. Conversely, user mobile phone usage can indicate that the user is distracted (i.e., not paying attention to the content presented on the screen). Examples disclosed herein assign or classify user activities (e.g., user movement, remote control usage, smartphone usage) based on distraction factors and/or attention factors to obtain a relative measure indicating an overall attention level associated with a given media viewing session (e.g., television session, etc.). In some examples, user activity can be determined (e.g., detected, identified, predicted) based on data captured from one or more devices such as remote controls, motion sensors, mobile phones, electronic tablets, biometric wearable devices, etc. during the given media viewing event (e.g., television session). In examples disclosed herein, data for each user action can be filtered, processed, and/or weighted to estimate a level of impact to a panelist's attention and/or distraction over time. As such, examples disclosed herein provide a measurement indicative of a user's attention level during a media viewing event (e.g., television session) based on detection and/or prediction of varying user activities.

Although examples disclosed herein are discussed in connection with viewing media, disclosed examples apply to monitoring media exposure more generally. Thus, although examples disclosed herein refer to, for instance, a viewing area, examples disclosed herein more generally apply to a media exposure area. Examples disclosed herein apply to, for instance, television monitoring, audio/radio monitoring, and/or other types of media exposure.

FIG. 1 illustrates an example audience monitoring system 100 constructed in accordance with teachings of this disclosure. In this example, the audience monitoring system 100 is implemented in a house 102. However, the audience monitoring system 100 of FIG. 1 could be implemented in other environments. The example system 100 of FIG. 1 includes an example media presentation device 119. In the example of FIG. 1, the media presentation device 119 is a television. The media presentation device 119 can include other types of media presentation devices and/or electronic user devices (e.g., a personal computer). In operation, the media presentation device 119 presents content such as television shows, movies, commercials, etc. The example of FIG. 1 can include additional media presentation devices 119.

In the illustrated example, the media presentation device 119 is located in an example primary media exposure area or a primary viewing area 106 (e.g., a living room) of the house 102. For example, as illustrated in FIG. 1, a first user 110 and a second user 112 can view the media presentation device 119 while in the primary viewing area 106. While in the example of FIG. 1 two users 110, 112 are shown, any other number of users can be present in the viewing area 106. A household 104 can be defined based on the first user 110, the second user 112, and other users who live in the house 102.

In some examples, the user(s) 110, 112 have access to user device(s) 114 (e.g., mobile phone, smartwatch, tablet, etc.) other than the media presentation device 119 while in the primary viewing area 106. In some examples, the user(s) 110, 112 interact with the user device(s) 114 at one or more instances while content is presented by the media presentation device 119. The example user device(s) 114 can be stationary or portable computers, handheld computing devices, smart phones, and/or any other type of device that may be connected to a network (e.g., the Internet). In the example of FIG. 1, the user device(s) 114 can include an example laptop 115, an example wearable device 116 (e.g., a smartwatch), an example electronic tablet 117, and/or an example smartphone 118. In some examples, a wearable device such as the smartwatch 116 can include sensors such as an accelerometer to generate outputs indicative of movement by the wearer of the device and/or sensors to generate biometric data that may be indicative of attention (e.g., a heart rate sensor). In some examples, the wearable device can be used to capture any type of user-based activity (e.g., movement, audio, etc.). In some examples, a microphone connected to the wearable device detects speech in the environment (e.g., speech generated by the user). In some examples, speech generated in the environment can be indicative of user distraction. In some examples, speech generated can be indicative of attention (e.g., discussion of content shown on the media presentative device 119). The example user device(s) 114 can additionally or alternatively include other type(s) of device(s) such as, for example, a camera, a virtual assistant technology system, etc. In some examples, the user device(s) 114 of FIG. 1 can be used to access (e.g., request, receive, render and/or present) online media provided, for example, by a web server. For example, users 110, 112 can execute a web browser on the user device(s) 114 to view media.

The example system 100 of FIG. 1 includes one or more example metering devices 120, such as a Global Television Audience Metering (GTAM) meter, an Active/Passive (A/P) meter, etc., communicatively coupled to, or otherwise structured to monitor, the media presentation device 119. The metering device 120 may be a standalone device proximate (e.g., within a few feet of) to the media presentation device 119. In other examples, the metering device 120 may be coupled to (e.g., carried by) the media presentation device 119. In some examples, the metering device 120 is integrated into the media presentation device 119. In some examples, the metering device 120 can include a unique identifier (ID) and is associated with a household ID for household 104. In some examples, the metering device 120 generates and collects signatures and/or watermarks from the media presentation device 119. The signatures and/or watermarks can be used to determine the specific media content (e.g., a TV show, a movie, a commercial, etc.) to which the metering device 120 was exposed and, thus, the audience (e.g., the first user 110, the second user 112) exposed to the media. This information can be used to generate, for example, ratings and/or ranking reports that may be provided to, for instance, media and/or advertising providers.

In the example of FIG. 1, the first user 110 and/or the second user 112 can be assigned a respective user identifier that is used to determine which user(s) 110, 112 are consuming media presented by the media presentation device 119 at a particular time. The user identifiers may be, for example, a numerical code representative of the user 110, 112, the first name of the user 110, 112, etc. In some examples, the user identifier is associated with demographic information (e.g., location, age, gender, etc.) for each user 110, 112. In the example of FIG. 1, the user(s) 110, 112 provide their respective user identifier(s) when interacting with (e.g., viewing) the media presentation device 119. In examples disclosed herein, the user(s) 110, 112 can provide their corresponding user identifiers via an example remote control device 108.

When the media presentation device 119 is presenting content, one or more of the users 110, 112 may enter, move about, or exit the primary viewing area 106. Thus, respective ones of the users 110, 112 may be exposed to the content presented via the media presentation device 119 at different times and/or for varying durations of time. As such, the example system 100 of FIG. 1 includes one or more motion sensors 122 to detect movement by the user(s) 110, 112 relative to the primary viewing area 106. The motion sensor(s) 122 can include, for instance, infrared sensors or passive infrared (PIR) sensors. A PIR sensor detects changes in infrared radiation (e.g., heat energy) within a field of view of the sensor. The example system 100 of FIG. 1 can include additional or fewer motion sensors 122 than shown in FIG. 1 and/or different types of sensors (e.g., microwave motion detectors). Also, the location(s) of the motion sensor(s) 122 can differ from the example shown in FIG. 1. The example motion sensor(s) 122 detect movement within a field of view that includes at least a portion of the primary viewing area 106. For instance, the motion sensor(s) 122 can have a 150° field of view. In some examples, the motion sensor(s) 122 are carried by the metering device 120 (e.g., removably coupled thereto, built-in). In some examples, the motions sensor(s) 122 include a Fresnel lens that divides the respective fields of view of the motion sensor(s) 122 into sub-sections or grids. In such examples, motion can be tracked across the sub-sections of the field of view of several motion sensor(s) 122 to track movement across the primary viewing area 106.

In some examples, during presentation of content via the media presentation device 119, the user(s) 110, 112 provide input(s) via the remote control device 108. Input(s) from the remote control device 108 can indicate whether the user is changing a channel presented via the screen of the media presentation device 119 and/or whether the user is adjusting other setting(s) associated with the media presentation device 119 (e.g., increasing volume, decreasing volume, initiating a recording, etc.). While in the example of FIG. 1 the remote control device 108 is used to control the media presentation device 119, any other type of remote control device can be used as part of the assessment of user activity (e.g., air conditioning (AC) remote control device, stereo-based remote control device, etc.). As such, while some activity associated with a remote control device (e.g., remote control device 108 of FIG. 1) indicates attention to content presented using the media presentation device 119, other types of activities associated with remote control device(s) not connected to the media presentation device 119 (e.g., AC remote control device, etc.) can be indicative of user distraction.

In some examples, during presentation of content via the media presentation device 119, the user interacts with (i.e., provide input(s) at), one or more of the user device(s) 114 (e.g., laptop 115, smartwatch 116, electronic tablet 117, smartphone 118). In the example of FIG. 1, processor circuitry of the respective user devices 114 can implement screen status identifier circuitry 123. In some instance, the screen status identifier circuitry 123 is an application installed on the device 114. The screen status identifier circuitry 123 detects changes in a state of a screen of the device 114 (e.g., a change from the screen being in an "off" state to an "on" state, a duration for which the screen is in an "on" state). As disclosed herein, data from the screen status identifier circuitry 123 can be used to determine whether the user is engaged with one of the user device(s) 114 during presentation of media by the media presentation device 119 (e.g., the data can be used to determine the attention and/or distraction estimation levels for each of the user(s) 110, 112). In some examples, the screen status identifier circuitry 123 can capture screenshot(s) of application(s) on the screen of the user device in order to determine user activity (e.g., use of a text messaging application, etc.). As disclosed herein, the screen status identifier circuitry 123 can be in communication with example user attention analyzing circuitry 124 and/or example cloud-based device(s) 126 of FIG. 1.

As disclosed herein, in some examples, the user device(s) 114 include a wearable device (e.g., the smartwatch 116). In addition to or alternatively to information about a screen state of the wearable device, the wearable device can generate motion data, biometric data, and/or user-based physiological data. As disclosed herein, the user attention analyzing circuitry 124 can use the data from the wearable device 116 to determine user activity information (e.g., level of user motion, whether the user is sleeping, etc.). In some examples, this data can be used in combination with other input data source(s) (e.g., remote control device 108, image sensors 121, etc.) to assess user activity. In some examples, in addition to or as an alternative to capturing user activity from devices such as sensors (e.g., motion sensors), user activity data can be captured using different network protocols and/or application programming interfaces (APIs) to obtain an indication of user activity status from the user devices 114 (e.g., the smartphone 118, the electronic tablet 117) connected to the network 126. For example, the status of a user device 114 (e.g., smartphone, tablet, media player) can be obtained via a communicative coupling between the smart device 114 and the user attention analyzing circuitry 124 through a network protocol, where the user attention analyzing circuitry 124 makes queries regarding application status, device status, etc. and the device responds (e.g., via the screen status identifier circuitry 123, another application, etc.). For example, user activity can be identified by remote queries to the smartphone 118 to retrieve data from an application or other software that provides information about other smart devices in, for instance, the user's home that are controlled by the smartphone (e.g., a smart kettle, a smart oven, etc.). For instance, an indication that the oven is in use may indicate a level of distraction of the user. In other examples, a smart home device (e.g., smart kettle, smart oven, etc.) can directly respond to queries from the user attention analyzing circuitry regarding operational status via the network 126. In some examples, user activity can be obtained by a remote query to the smart user device 114 (e.g., smartphone, tablet, etc.) to detect which application is running in the foreground of the user device 114 and the application's state. For example, a mobile game that is running in the foreground on the smartphone 118 implies a higher distraction factor as compared to usage of a web browser to browse information about a given movie being displayed on the media presentation device 119. In some examples, the user activity can be captured and/or assessed based on monitoring of network traffic to predict and/or estimate usage of the target user device(s).

In some examples, a metering device 120 includes one or more image sensors 121 (e.g., camera(s)). The image sensors 121 generate image data of at least a portion of the primary viewing area 106. In some examples, user-based movement can be detected based on the signals output by the motion sensor(s) 122. In some examples, the image sensor(s) 121 can be used to generate image data of the primary viewing area 106 in response to detection of motion by the motion sensor(s) 112. For privacy purposes, the image sensor(s) 121 and/or the metering device 120 can include flash indicator(s) to alert individuals (e.g., the users 110, 112) in the primary viewing area 106 that the image sensor(s) 121 are capturing images.

In the example of FIG. 1, the media presentation device 119, the remote control device 108, the user device(s) 114, the screen status identifier circuitry 123, image sensor(s) 121, and/or motion sensor(s) 122 are communicatively coupled to the example user attention analyzing circuitry 124 of the system 100 of FIG. 1. The user attention analyzing circuitry 124 can be implemented by processor circuitry (e.g., semiconductor-based hardware logic device(s)) of the metering device 120 and/or one or more of the user device(s) 114. In some examples, the user attention analyzing circuitry 124 can be implemented by, for example, the example cloud-based device 126 (e.g., one or more server(s), processor(s), and/or virtual machine(s)), etc. Outputs (e.g., signals) from one or more of the media presentation device 119, the remote control device 108, the user device(s) 114, the screen status identifier circuitry 123, the image sensor(s) 121, and/or the motion sensor(s) 122 can be transmitted to the user attention analyzing circuitry 124 via one or more wired or wireless communication protocols (e.g., WiFi, Bluetooth®). In some examples, the cloud-based device 126 includes a network that can be implemented using any suitable wired and/or wireless network(s) including, for example, one or more data buses, one or more Local Area Networks (LANs), one or more wireless LANs, one or more cellular networks, the Internet, etc.

The example user attention analyzing circuitry 124 of FIG. 1 determines the respective attention level of the user(s) 110, 112 during presentation of content by the media presentation device 119 based on the information or data captured by the motion sensor(s) 122, the user device(s) 114, the screen status identifier circuitry 123, the image sensor(s) 121, the remote control device 108, etc. For example, the user attention analyzing circuitry 124 tracks (e.g., predicts) user attention level(s) while content is presented via the media presentation device 119 based on user activities performed during the period of time when the content is being presented. In some examples, the user attention analyzing circuitry 124 determines user-based attention level(s) based on various user activities, including, for example, user movement about the viewing area 106 as tracked using the motion sensor(s) 122, user interaction(s) with user device(s) 114 based on indications of changes in an on/off state of screen(s) of the user device(s) 114 as detected by the screen status identifier circuitry 123, and/or user interaction(s) with the remote control device 108. In some examples, the user attention analyzing circuitry 124 assigns distraction factor(s) and/or attention factor(s) to the identified user activities to determine (e.g., predict, estimate) a measurement(s) representative of user attention, as disclosed in more detail in connection with FIG. 3.

In some examples, the user attention analyzing circuitry 124 analyzes signals output by the motion sensor(s) 122 and/or the wearable device(s) 116 to determine (e.g., predict, recognize) if any of the user(s) 110, 112 have entered, left, or substantially moved above the primary viewing area 106. In some examples, in response to detection of a change in movement relative to the primary viewing area 106, the user attention analyzing circuitry 124 can generate a request to verify which user(s) 110, 112 are present in the primary viewing area 106. In some examples, the user attention analyzing circuitry 124 causes one or more devices (e.g., the media presentation device 119) to output the request or prompt to verify which user(s) 110, 112 are present in the primary viewing area 106.

The user attention analyzing circuitry 124 analyzes user input(s) received via the remote control device 108, the user device(s) 114, the screen status identifier circuitry 123, and/or the image data generated by the image sensor(s) 121 to determine the user(s) 110, 112 activities in the primary viewing area 106 at a particular time. For example, the user attention analyzing circuitry 124 can image data generated by the image sensor(s) 121. In some examples, user position and/or posture can be identified to determine whether the user 110, 112 is looking forward relative to the media presentation device 119 (and, thus, likely looking at the screen of the media presentation device 119 of FIG. 1) or looking downward (and, thus, likely looking at the screen of, for instance, the smartphone 118).

In some examples, the user attention analyzing circuitry 124 analyzes input(s) from the remote control device 108 to detect user-based inputs to change a channel, pause the content shown on the screen of the media presentation device 119, etc. In some examples, the user analyzing circuitry 124 analyzes biometric data from the smartwatch 116 or other wearable device to detect whether, for instance, the user 110, 112 is sleeping based on heart rate data collected by the wearable device. In some examples, the user attention analyzing circuitry 124 can analyze input(s) from the screen status identifier circuitry 123 to detect whether the screen of the phone is in an "off" state or an "on" state, track the duration of time the screen is in the "on" state, etc. For example, the user attention analyzing circuitry 124 can determine that the duration of the "on" state of the smartphone 118 surpasses a threshold based on data from the screen status identifier circuitry 123. In this example, the user attention analyzing circuitry 124 can determine that the user is likely using the smartphone 118 and therefore is distracted from the content shown on the screen of the media presentation device 119.

Physical activity (e.g., movement) and/or usage of other electronic devices (e.g., user device(s) 114) during a media session (e.g., content presented using the media presentation device 119) can represent a degree to which a panelist (e.g., user 110, 112) is paying attention to the media content. Different activities can have different impacts to a panelist's attention. For example, a given activity can indicate distraction (e.g., writing a text message on the smartphone 118 while watching television) or attention (e.g., using the remote control device 108 to browse content on the television). In some examples, the user activities can vary in intensity, duration, and/or frequency, etc., which affects the level of impact on attention and/or distraction level(s) during the period of time for which the media is presented.

In some examples, the user attention analyzing circuitry 124 correlates the user activity information and/or attention levels determined therefrom with signatures and/or watermarks, etc. of the particular media content presented via the media presentation device 119 and captured by the metering device 120 to identify user activity and/or attention levels during presentation of particular media content. In some examples, the user attention analyzing circuitry 124 assigns timestamps to the signals output by the motion sensor(s) 122 and/or data captured by the user device(s) 114, the wearable device(s) 116, the image sensor(s) 121, the screen status identifier circuitry 123, etc. The user attention analyzing circuitry 124 can correlate the timestamps indicative of user activity with the presentation of the media content to determine user-based attention level(s) during operation of the media presentation device 119. In particular, the user attention analyzing circuitry 124 can provide outputs identifying which content the user may have missed or not fully paid attention to because he or she was distracted when the content was presented. The user attention information can be stored in a database for access by, for instance, a media broadcaster. The data generated by the user attention analyzing circuitry 124 in connection with the data generated by the metering device 120 can be used to determine the media presented to the member(s) 110, 112 of the household 104, which media each individual user 110, 112 was exposed to, a duration of time for which the user(s) 110, 112 were exposed, the attention and/or distraction level(s) of the user(s) 110, 112 during the media presentation, etc.

Figure 2:
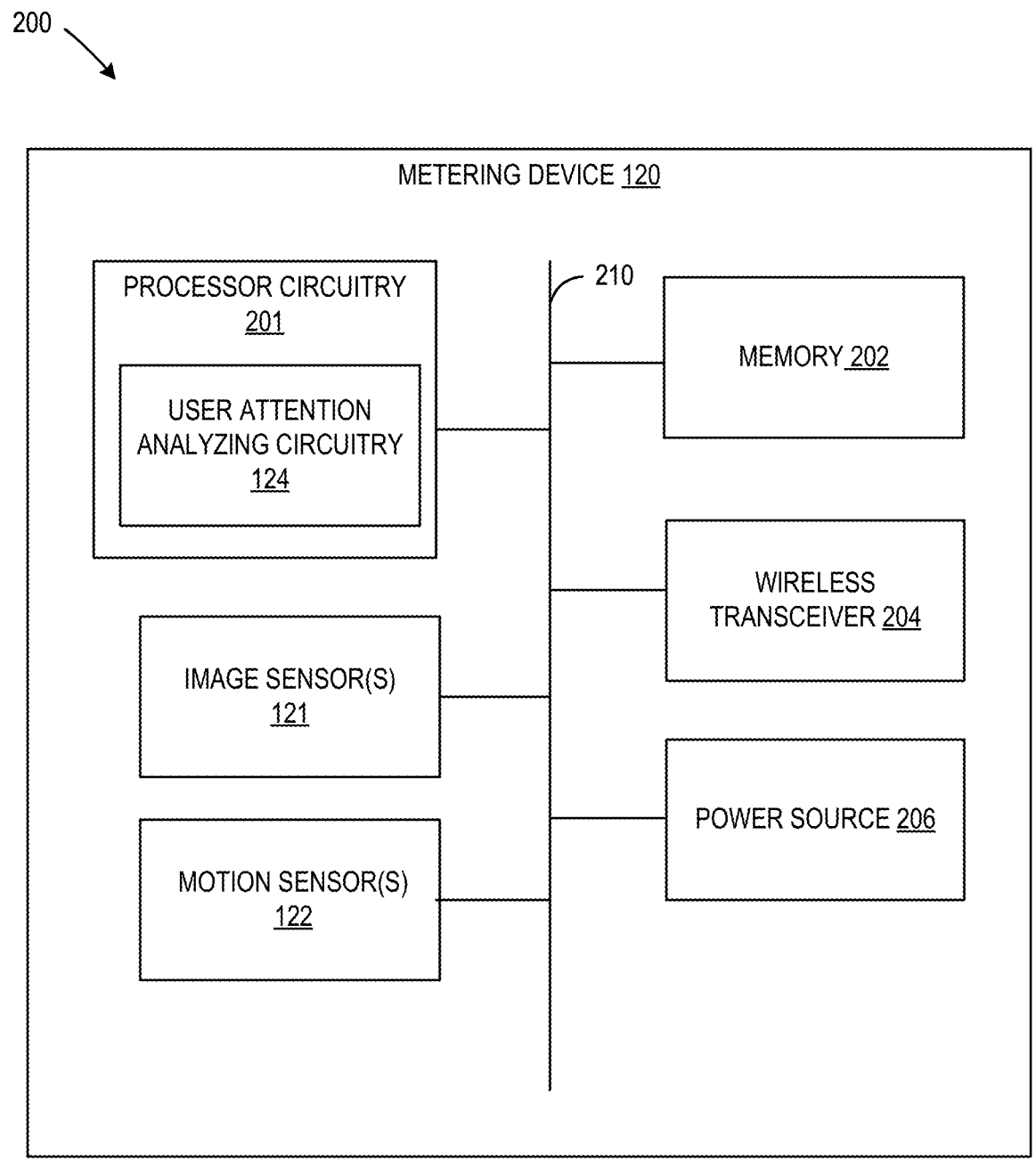
FIG. 2 is a block diagram of an example implementation of the metering device of FIG. 1.

FIG. 2 is a block diagram 200 of the example metering device 120 of FIG. 1 to perform audience-based metering. The metering device 120 of FIG. 2 may be instantiated (e.g., creating an instance of, bring into being for any length of time, materialize, implement, etc.) by processor circuitry such as a central processing unit executing instructions. Additionally or alternatively, the metering device 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example, the metering device 120 includes example processor circuitry 201, example memory 202, an example wireless transceiver 204, and an example power source 206. The power source 206, which can be, for instance, a battery and/or transformer and AC/DC converter, provides power to the processor circuitry 200 and/or other components of the metering device 120 communicatively coupled via an example bus 210.

The example memory 202 of FIG. 2 can store identifying information for the metering device 120, other devices in the example system 100 of FIG. 1 (e.g., media presentation device 119), known user identifiers for the user(s) 110, 112 (e.g., first names, panelist identifiers, etc.), and/or the media signatures and/or watermarks (e.g., codes) collected by the metering device 120.

The example metering device 120 of FIG. 2 includes the motion sensor(s) 122 (i.e., one or more motion sensors) and the image sensor(s) 121. In some examples, the motion sensor(s) 122 and/or the image sensor(s) 121 are disposed in a housing of the metering device 120. However, in some examples, the motion sensor(s) 122 and/or the image sensor(s) 121 can be external to the housing of the metering device 120 (e.g., externally coupled thereto, coupled via wired and/or wireless connections, etc.).

The wireless transceiver 204 of the example metering device 120 can communicate with the remote control device 108 (FIG. 1) to detect input(s) entered via the remote control device 108.

In the example of FIG. 2, the user attention analyzing circuitry 124 is implemented by the processor circuitry 201 of the metering device 120. The processor circuitry 200 of the illustrated example is a semiconductor-based hardware logic device. However, in some examples, the user attention analyzing circuitry 124 can be implemented by the example cloud-based device 126 of FIG. 1 (e.g., one or more server(s), processor(s), and/or virtual machine(s)).

Figure 3:
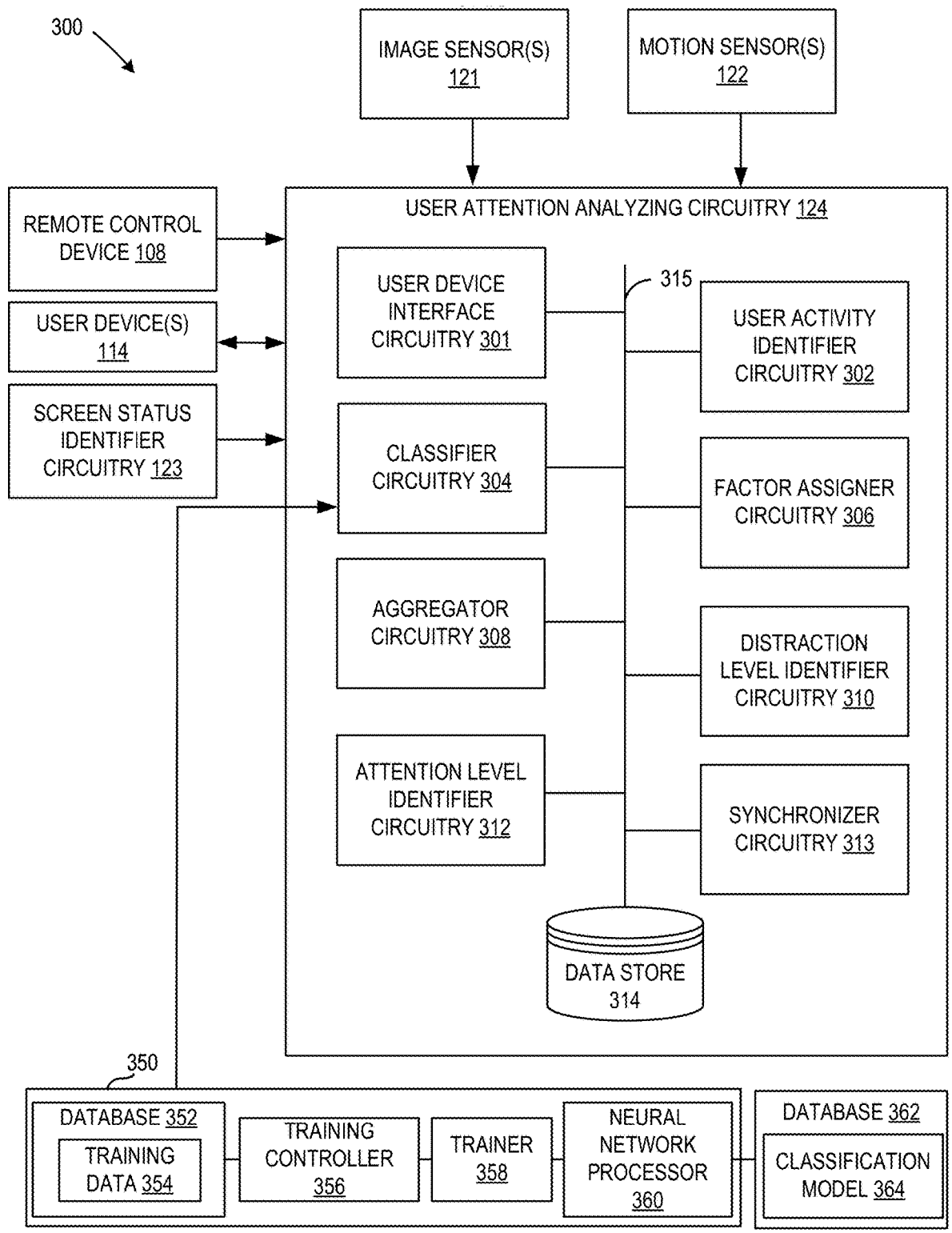
FIG. 3 is a block diagram of an example implementation of the user attention analyzing circuitry of FIG. 1.

FIG. 3 is a block diagram 300 of the example user attention analyzing circuitry 124 of FIG. 1 to perform user attention analysis. The user attention analyzing circuitry 124 of FIG. 1 may be instantiated (e.g., creating an instance of, bring into being for any length of time, materialize, implement, etc.) by processor circuitry such as a central processing unit executing instructions. Additionally or alternatively, the user attention analyzing circuitry 124 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In the example of FIG. 3, the user attention analyzing circuitry 124 includes user device interface circuitry 301, user activity identifier circuitry 302, classifier circuitry 304, factor assigner circuitry 306, aggregator circuitry 308, distraction level identifier circuitry 310, attention level identifier circuitry 312, synchronizer circuitry 313, and a data store 314. In some examples, the data store 314 is external to the user attention analyzing circuitry 124 in a location accessible to the user attention analyzing circuitry 124.

In the example of FIG. 3, the user device interface circuitry 301 receives input(s) from one or more from the image sensor(s) 121, the motion sensor(s) 122, the remote control device 108, the wearable device(s) 116, the screen status identifier circuitry 123, and/or the user device(s) 114 (e.g., the laptop 115, the smartwatch 116, the electronic tablet 117, the smartphone 118). In some examples, the user device interface circuitry 301 receives data from the media presentation device 119 indicating that the media presentation device 119 is turned on or off. The input(s) can be stored in, for example, the data store 314.

For example, the user device interface circuitry 301 can receive input(s) from the screen status identifier circuitry 123 of one of the user devices 114 indicting that a state of the screen of that user device 114 has changed from an "off" state to an "on" state. As another example, the user device interface circuitry 301 can received input(s) from the remote control device 108 in response to the user 110, 112 changing channels. In some examples, the user device interface circuitry 301 receives input(s) from the motion sensor(s) 122 in response to detection of movement within a range of the motion sensor(s) 122. In some examples, the user interface circuitry 301 receives the input(s) in substantially real-time (e.g., near the time the data is collected). In some examples, the user interface circuitry 301 receives the input(s) at a later time (e.g., periodically and/or aperiodically based on one or more settings but sometime after the activity that caused the sensor data to be generated, such as a user moving around the viewing area 106, has occurred (e.g., seconds later) or a change in the operative state of the screen that prompts the screen status identifier circuitry 123 to transmit data to the user attention analyzing circuitry 124). In some examples, the user attention analyzing circuitry 124 is instantiated by processor circuitry executing user attention analyzing circuitry 124 instructions and/or configured to perform operations such as those represented by the flowchart of FIG. 4.

The user activity identifier circuitry 302 identifies (e.g., predicts) the occurrence of user activity (UA) during presentation of content via the media presentation device 119 based on the input(s) received via the user device interface circuitry 301. For example, overall attention of a panelist user activity can be monitored based on data indicative of user engagement with one or more user devices (e.g., remote control device(s) 108, motion sensor(s) 122, user device(s) 114 including wearable device(s) 116, electronic tablet(s) 117, smartphone(s) 118, etc.) during a media viewing session (e.g., a television session). In some examples, the user activity identifier circuitry 302 identifies user actions performed over time (e.g., a first user action, a second user action, etc.). In some examples, the user activity identifier 302 determines (e.g., predicts) a type of user activity performed (e.g., user movement, remote control keypress, phone screen activity, etc.), as disclosed in connection with FIG. 7A.

For example, the user activity identifier circuitry 302 can determine (e.g., predict, recognize) user activity based on one or more user activity identification rules associated with usage of the user device(s) 114. For example, if the screen status identifier circuitry 123 reports that the screen of a user device 114 such as the smartphone 118 has been in an "on" state for a duration of five seconds, there is a high probability that the user is actively using the user device 114 (e.g., the smartphone 118). The user activity identification rule(s) can indicate that when the screen status identifier circuitry 123 reports that a screen of a user device 114 is in an "on" state for a threshold duration of time, the user activity identifier circuitry 302 should determine that the user is actively using the user device (e.g., the smartphone 118). The user activity identification rule(s) can be defined by user input(s) and stored in the data store 314. In some examples, the user activity identifier circuitry 302 determines user activity based on screenshots captured using the screen status identifier circuitry 123. For example, the user activity identifier circuitry 302 can determine user activity based on the type(s) of active application(s) that can be used to indicate user attention and/or distraction (e.g., text messaging application, etc.). For example, the user activity identifier circuitry 302 can determine user attention based on queries over the network 126 to monitor the status of a user device (e.g., smart oven, etc.) and/or monitor the status of a custom application that operates on the smartphone (e.g., to monitor operating system events, etc.). In some examples, the user activity identification rule(s) are generated based on machine-learning training.

In some examples, the user activity identifier circuitry 302 can determine occurrence(s) of user activity based on input(s) from wearable device(s) (e.g., the smartwatch 116). For example, the user activity identifier circuitry 302 can receive accelerometer data from the wearable device 116 indicative of a particular rate of movement. Based on the user activity identification rule(s) and the accelerometer data, the user activity identifier circuitry 302 can predict whether the user 110, 112 is sitting still or walking in the viewing area 106. As another example, based on the user activity identification rule(s) and biometric data from the wearable device 116, the user activity identifier circuitry 302 can identify whether the user is resting. For example, a particular heartrate can be identified in the user activity identification rule(s) as indicative of the user sleeping.

In some examples, the user activity identifier circuitry 302 performs image analysis to identify certain activities in image data from the image sensor(s) 121. Based on the image analysis, the user activity identifier 302 can recognize that the user 110, 112 is in a certain position and/or has a certain posture while in the viewing area 106. For instance, based on the image analysis, the user activity identifier 302 can recognize that the user is looking in a particular direction (e.g., user is looking downwards, sideways relative to the media presentation device 119, or in the direction of the media presentation device 119). The user activity identifier circuitry 302 can be trained to perform image analysis based on machine learning training.

The user activity identifier circuitry 302 can determine user activities over the duration for which the media presentation device 119 is operative and based on input(s) received from the image sensor(s) 121, the motion sensor(s) 122, the remote control device 108, the screen status identifier circuitry 123, and/or the user device(s) 114 over time. Thus, in some instances, the user activity identifier circuitry 302 identifies two or more activities for the respective users 110, 112 over time during operation of the media presentation device 119. In some examples, the user activity identifier circuitry 302 is instantiated by processor circuitry executing user activity identifier circuitry 302 instructions and/or configured to perform operations such as those represented by the flowchart of FIG. 4.

The classifier circuitry 304 classifies a given user activity identified by the user activity identifier circuitry 302 as a user activity indicating distraction or attention on the part of the user with respect to the media content presented on the media presentation device 119. For example, the user activities can be classified as distraction or attention based on the type of activity. For example, when the user activity identifier circuitry 302 detects that a screen of the smartphone 118 is turned on and, thus, the user is likely looking at the smartphone screen rather than the media presentation device 119, the classifier circuitry 304 associates such activity with distraction on the part of the user. When the user activity identifier circuitry 302 identifies movement by the user within the viewing area 106, such movement can indicate an activity that reduces the user's focus on the television screen. As such, the classifier circuitry 304 classifies the user's movement as a distraction. In some example, the classification of the user's movement as a distraction or attention is based on analysis of user activity from two or more input(s) (e.g., image sensor input, motion sensor input, etc.) to verify whether the user's movement is more likely to be associated with a distraction or attention (e.g., a movement such as readjusting a sitting position in a chair versus a movement such as a user lifting a user device, etc.). As described in connection with an example computing system 350 of FIG. 3, the classifier circuitry 304 is trained to recognize and/or categorize a given user activity as distraction-indicating behavior or attention-indicating behavior based on machine learning models that provide for categorizing user behavior. In some examples, the classifier circuitry 304 is instantiated by processor circuitry executing classifier circuitry 304 instructions and/or configured to perform operations such as those represented by the flowchart of FIG. 5.

For example, as disclosed in more detail in connection with FIGS. 7A-7D, movement of a user can be captured by an accelerometer on a user's wearable device, which can report the rate of a user's movement. Based on the user activity identification rule(s), the user activity identifier circuitry can determine that the user is walking. Based on neural network training, the classifier circuitry 304 classifies the movement (e.g., walking) as a distraction. In some examples, the user activity identifier 302 detects a keypress on the remote control based on signals output by the remote control device 108. The classifier circuitry 304 can classify the user activity involving the remote control device 108 as an attention-based activity because the user is interacting with the media presentation device 119. In some examples, the classifier circuitry 304 can classify user behavior based on activities identified relative to the user device(s) 114. For example, when the user activity identifier 302 determines (e.g. predicts) that the user is looking at his or her electronic tablet 117 based on data from the screen status identifier circuitry 123 indicating that that the screen of a user device is in an "on" state, the classifier circuitry 304 can classify the user activity as a distraction-based activity because looking at the screen of the electronic tablet 117 shifts the user's focus from the media presentation device 119 to the electronic tablet 117.

The example classifier circuitry 304 of FIG. 3 executes neural network model(s) to classify the user activity as an attention-based activity or a distraction-based activity relative to the content presented on the media presentation device 119. While in the example of FIG. 3 the classifier circuitry 304 executes a neural network model, the classifier circuitry 304 can use other types of model(s) to classify user activities (e.g., a deterministic model relying on a deterministic list of static classes, fixed mapping rules, etc.). As shown in FIG. 3, a computing system 350 trains a neural network to generate a classification model based on training data associated with user-based activities. The example computing system 350 can include a neural network processor 360. In examples disclosed herein, the neural network processor 360 implements a neural network. The example computing system 350 of FIG. 3 includes a neural network trainer 358. The example neural network trainer 358 of FIG. 3 performs training of the neural network implemented by the neural network processor 360. The example computing system 350 of FIG. 3 includes a training controller 356. The training controller 356 instructs the neural network trainer 358 to perform training of the neural network based on training data 354. In the example of FIG. 3, the training data 354 used by the neural network trainer 358 to train the neural network is stored in a database 352. The example database 352 of the illustrated example of FIG. 3 is implemented by any memory, storage device and/or storage disc for storing data such as, for example, flash memory, magnetic media, optical media, etc. Furthermore, the data stored in the example database 352 may be in any data format such as, for example, binary data, comma delimited data, tab delimited data, structured query language (SQL) structures, image data, etc. While the illustrated example database 352 is illustrated as a single element, the database 352 and/or any other data storage elements described herein may be implemented by any number and/or type(s) of memories.

In the example of FIG. 3, the training data 354 can include data (e.g., image data, video data, and/or sensor input-based data) representative of individuals performing various activities which have been classified as distraction-based activities (e.g., browsing on a user device) or attention-based activities (e.g., pressing a remote control button). The neural network trainer 358 can train the neural network implemented by the neural network processor 360 using the training data 354. Based on the user activities in the training data 354, the neural network trainer 358 trains the neural network to recognize distraction-based and/or attention-based user activities associated with the input data received by the user attention analyzing circuitry 124 (e.g., image(s) from image sensor(s) 121, motion sensor data from motion sensor(s) 122, data associated with user devices 114, etc.). Classification model(s) 364 are generated as a result of the neural network training. The classification model(s) 364 are stored in a database 362. The databases 352, 362 may be the same storage device or different storage devices. The classifier circuitry 304 executes the classification model(s) 364 to generate a classification associated with the user activity-based data input.

The factor assigner circuitry 306 assigns a distraction factor or an attention factor to a given user activity (e.g., a first user activity, a second user activity, etc.) classified by the classifier circuitry 304. For example, each classified user activity can be filtered, processed and/or weighted based on an estimated or probable impact of the activity to a user's (e.g., panelist's) attention or distraction level over time. In the example of FIG. 3, the factor assigner circuitry 306 generates corresponding sequences of assigned distraction factors (DF) (e.g., represented using $DF_{1...n}(t)$) and attention factors (AF) (e.g., represented using $AF_{1...m}(t)$) for the classified user activities. For example, a distraction factor represents the level e.g., probability) of distraction over time for an activity, while an attention factor represents the level (e.g., probability) of attention over time. In some examples, the distraction factors and/or the attention factors can be determined empirically (e.g., estimation based on statistics and probability, artificial intelligence-based assignment, etc.) or experimentally (e.g., based on a study of isolated user actions of a group of panelists in a controlled environment, etc.). For example, the distraction factors and attention factors can be converted to common comparable units (e.g., using the same range and scale) using a relative (i.e., proportional ratio) or absolute (e.g., system of points) approach. For example, the attention factors and the distraction factors can be converted into comparable (e.g., compatible) range values (e.g., a common amplitude), such that the same value associated with different attention factors and/or distraction factors results in the same effect on the level of distraction and/or the level of attention. For example, a status identifier received from a user device 114 (e.g., tablet user activity (UA)={"ON", "OFF"}) can be converted into a numerical value using a relative scale (e.g., distraction factor (DF)={1, 0}), with the distraction factor adjusted based on the corresponding level of impact on user attention (e.g., a factor of 0.7 corresponding to a 70% probability of the user being distracted, such that DF={0.7, 0}). In some examples, two separate user activities can be received (e.g., UA1 associated with movement data from a sensor on a wearable device 116, where UA1={0, 100} and UA2 associated with the remote control device 108, where UA2={0, 5000}). If UA2=5000 indicates full user attention (e.g., 100%) and UA1=100 indicates a 20% probability of the user being distracted, a factor of 0.2/100 can be assigned to UA1 and a factor of 1/5000 can be assigned to UA2 to obtain corresponding distraction factors DF1={0, 0.2} and DF2={0, 1} in relative scale. In some examples, an absolute common scale can be used instead of a relative scale for all attention factors (AFs) and/or distraction factors (DFs), such that UA1 and UA2 can be rescaled as needed (e.g., DF1={0, 200} and DF2={0, 1000}). The probabilities and/or values assigned to the factors and/or user activities can be based on, for instance, predefined user inputs. In some examples, the factor assigner circuitry 306 assigns a distraction factor as proportional to the user activity and/or normalized to a maximum value to obtain a relative scale, as disclosed in connection with FIG. 7B. For example, the factor assignor circuitry 306 may assign a user activity corresponding to movement for a duration of five seconds a lower distraction factor as opposed to a user activity corresponding to user movement for a duration of 15 seconds. In some examples, the factor assigner circuitry 306 assigns an attention factor as a linearly decreasing function (e.g., to account for a change in attention over time). For example, when a user 110, 112, changes a channel on the remote control device 108, the attention factor assigned to the remote control-based user activity can be shown as a linearly decreasing function because the user is likely most engaged at the time the user 110, 112 changes the channel via the remote control device 108. In some examples, the factor assigner circuitry 306 is instantiated by processor circuitry executing factor assigner circuitry 306 instructions and/or configured to perform operations such as those represented by the flowchart of FIG. 4.

Figure 6:
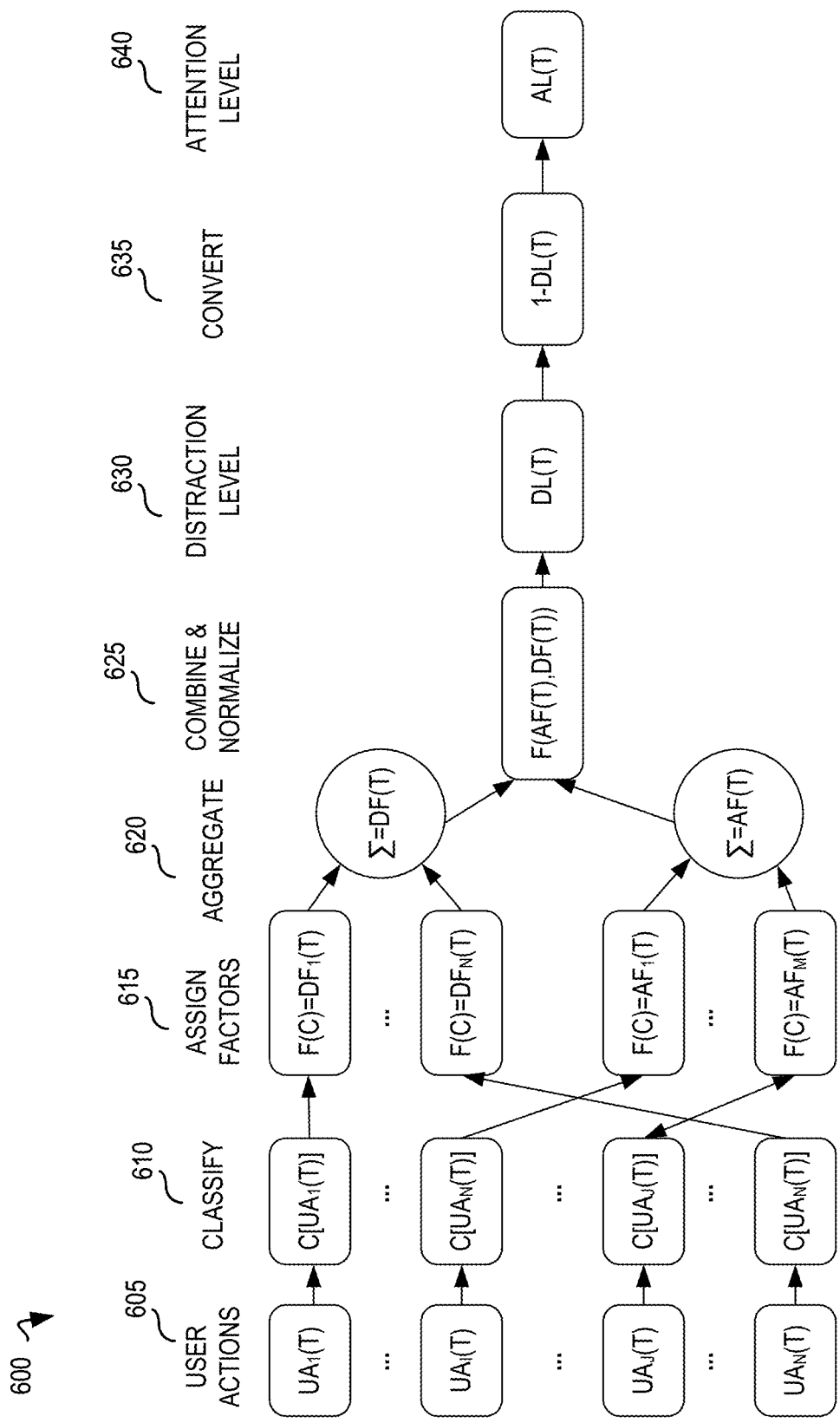
FIG. 6 is a flow diagram illustrating an example process for assigning distraction factors and attention factors to user activities to obtain a relative measure indicating an overall attention level during a television session in accordance with teachings of this disclosure.

The aggregator circuitry 308 aggregates the distraction factors (DFs) and attention factors (AFs) over time for a particular viewing interval after the factor assigner circuitry 306 has assigned a distraction factor or an attention factor to a given user activity, as disclosed in more detail in connection with FIG. 6. The aggregator circuitry 308 can perform any type of aggregation-based method (e.g., apply a function, a more complex statistical algorithm or artificial intelligence, etc.) to obtain cumulative DF(t) and AF(t). In some examples, the aggregator circuitry 308 is instantiated by processor circuitry executing aggregator circuitry 308 instructions and/or configured to perform operations such as those represented by the flowchart of FIG. 4.

The distraction level identifier circuitry 310 combines the attention factors over time (e.g., AF (t)) over distraction factors over time (e.g., DF(t)) and normalizes the result relative to a range of full attention ($A_{FULL}$) (e.g., peak value) to obtain the relative overall distraction level (e.g., DL(t)) for each user 110, 112 with respect to content presented via the media presentation device 119, as disclosed in more detail in connection with FIG. 6. For example, an absolute common scale or a relative scale can be used to determine the overall distraction level. In some examples, the result can be normalized to the target output range {0, $A_{FULL}$}, where $A_{FULL}=1$ is used to convert the result into the relative scale. The distraction level identifier circuitry 310 combines AF(t) and DF(t) (e.g., to obtain a nonbinary result).

In some examples, the distraction level identifier circuitry 310 determines the overall distraction level using example Equation Set 1, below. However, the distraction level can be determined using other type(s) of method(s). In the example of Equation Set 1, the distraction factors (e.g., DF(t)) and attention factors (e.g., AF(t)) are combined to determine the overall distraction level (e.g., DL(t)). For example, the distraction level (DL) at a particular point in time (t) can be identified using an integer of one when the difference between the distraction factor (DF) and the attention factor (AF) is greater than or equal to one and the DL can be identified as zero when the difference between the DF and the AF is less than or equal to zero. Likewise, the DL can be identified using the value of the difference between the DF and the AF when that value is determined to be greater than zero and less than 1, as shown below in connection with Equation Set 1:

$$f(AF(t), DF(t)) = DL(t) = \begin{cases} 1, & DF(t) - AF(t) \geq 1 \\ DF(t) - AF(t), & 0 < DF(t) - AF(t) < 1 \\ 0, & DF(t) - AF(t) \leq 0 \end{cases}$$

Equation Set 1

Furthermore, DL(t) can be normalized to the relative scale (e.g., range {0, 1}), as previously disclosed above, in order to provide a common scale compatible and/or provide comparable results to facilitate subsequent processing and/or analysis. As such, the attention level (AL) can be determined as follows: AL(t)=1−DL(t). In some examples, normalization is not performed. In such examples, the attention level can be determined using an identifier for full attention level (e.g., AL(t)), such that AL(t)=$A_{FULL}$−DL(t), where $A_{FULL}$ represents the range of full attention (e.g., peak value). In some examples, the distraction level identifier circuitry 310 is instantiated by processor circuitry executing distraction level identifier circuitry 310 instructions and/or configured to perform operations such as those represented by the flowchart of FIG. 4.

The attention level identifier circuitry 312 determines the overall attention level (e.g., AL(t)) of each user 110, 112 during a given media session (e.g., television session) for the media presentation device 119. For example, the user(s) 110, 112 can be assumed to have full attention during a media session by default. As such, the attention level identifier circuitry 312 can subtract the overall distraction level (e.g., DL(t)) from full attention (e.g., $A_{FULL}$) to obtain the overall attention level AL(t) during the media session for a corresponding user 110, 112, as disclosed in connection with FIG. 6. For example, the attention level identifier circuitry 312 can determine the attention level (AL(t)) for a particular user 110, 112 using the formula AL(t)=1−DL(t) for the duration of time of the media session (e.g., television session), which results in the final attention level for the respective user 110, 112 during the media session. In some examples, the attention level identifier circuitry 312 is instantiated by processor circuitry executing attention level identifier circuitry 312 instructions and/or configured to perform operations such as those represented by the flowchart of FIG. 4.

The synchronizer circuitry 313 synchronizes determined attention levels over time for each user 110, 112 with the media content presented via the media presentation device 119 of FIG. 1. For example, as the user attention level for a particular user 110, 112 varies over the duration of presentation of media, the synchronizer circuitry 313 correlates (e.g., time-synchronizes) the attention levels with the media content. As a result, the synchronizer circuitry 313 identifies the particular content corresponding to the user attention levels. In some examples, the synchronizer circuitry 313 identifies timestamps associated with media content that is correlated with a user attention level exceeding defined attention threshold(s) or failing to satisfy the attention threshold(s). The synchronizer circuitry 313 can output reports identifying the media content and corresponding attention levels. In some examples, the synchronizer circuitry 313 is instantiated by processor circuitry executing synchronizer circuitry 313 instructions and/or configured to perform operations such as those represented by the flowchart of FIG. 4.

The data store 314 can be used to store any information associated with the user device interface circuitry 301, user activity identifier circuitry 302, classifier circuitry 304, factor assigner circuitry 306, aggregator circuitry 308, distraction level identifier circuitry 310, attention level identifier circuitry 312, and/or synchronizer circuitry 313. The example data store 314 of the illustrated example of FIG. 3 can be implemented by any memory, storage device and/or storage disc for storing data such as flash memory, magnetic media, optical media, etc. Furthermore, the data stored in the example data store 314 can be in any data format such as binary data, comma delimited data, tab delimited data, structured query language (SQL) structures, image data, etc.

In some examples, the apparatus includes means for receiving user device input. For example, the means for receiving user device input may be implemented by user device interface circuitry 301. In some examples, the user device interface circuitry 301 may be instantiated by processor circuitry such as the example processor circuitry 912 of FIG. 9. For instance, the user device interface circuitry 301 may be instantiated by the example microprocessor 1100 of FIG. 11 executing machine executable instructions such as those implemented by at least block 415 of FIG. 4. In some examples, the user device interface circuitry 301 may be instantiated by hardware logic circuitry, which may be implemented by an ASIC, XPU, or the FPGA circuitry 1200 of FIG. 12 structured to perform operations corresponding to the machine readable instructions. Additionally or alternatively, the user device interface circuitry 301 may be instantiated by any other combination of hardware, software, and/or firmware. For example, the user device interface circuitry 301 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying user activity. For example, the means for identifying user activity may be implemented by user activity identifier circuitry 302. In some examples, the user activity identifier circuitry 302 may be instantiated by processor circuitry such as the example processor circuitry 912 of FIG. 9. For instance, the user activity identifier circuitry 302 may be instantiated by the example microprocessor 1100 of FIG. 11 executing machine executable instructions such as those implemented by at least block 418 of FIG. 4. In some examples, the user activity identifier circuitry 302 may be instantiated by hardware logic circuitry, which may be implemented by an ASIC, XPU, or the FPGA circuitry 1200 of FIG. 12 structured to perform operations corresponding to the machine readable instructions. Additionally or alternatively, the user activity identifier circuitry 302 may be instantiated by any other combination of hardware, software, and/or firmware. For example, the user activity identifier circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for classifying. For example, the means for classifying may be implemented by classifier circuitry 304. In some examples, the classifier circuitry 304 may be instantiated by processor circuitry such as the example processor circuitry 912 of FIG. 9. For instance, the classifier circuitry 304 may be instantiated by the example microprocessor 1100 of FIG. 11 executing machine executable instructions such as those implemented by at least block 425 of FIG. 4. In some examples, the classifier circuitry 304 may be instantiated by hardware logic circuitry, which may be implemented by an ASIC, XPU, or the FPGA circuitry 1200 of FIG. 12 structured to perform operations corresponding to the machine readable instructions. Additionally or alternatively, the classifier circuitry 304 may be instantiated by any other combination of hardware, software, and/or firmware. For example, the classifier circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for assigning factors. For example, the means for assigning factors may be implemented by factor assigner circuitry 306. In some examples, the factor assigner circuitry 306 may be instantiated by processor circuitry such as the example processor circuitry 912 of FIG. 9. For instance, the factor assigner circuitry 306 may be instantiated by the example microprocessor 1100 of FIG. 11 executing machine executable instructions such as those implemented by at least block 430 of FIG. 4. In some examples, the factor assigner circuitry 306 may be instantiated by hardware logic circuitry, which may be implemented by an ASIC, XPU, or the FPGA circuitry 1200 of FIG. 12 structured to perform operations corresponding to the machine readable instructions. Additionally or alternatively, the factor assigner circuitry 306 may be instantiated by any other combination of hardware, software, and/or firmware. For example, the factor assigner circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for aggregating factors. For example, the means for aggregating factors may be implemented by aggregator circuitry 308. In some examples, the aggregator circuitry 308 may be instantiated by processor circuitry such as the example processor circuitry 912 of FIG. 9. For instance, the aggregator circuitry 308 may be instantiated by the example microprocessor 1100 of FIG. 11 executing machine executable instructions such as those implemented by at least block 435 of FIG. 4. In some examples, the aggregator circuitry 308 may be instantiated by hardware logic circuitry, which may be implemented by an ASIC, XPU, or the FPGA circuitry 1200 of FIG. 12 structured to perform operations corresponding to the machine readable instructions. Additionally or alternatively, the aggregator circuitry 308 may be instantiated by any other combination of hardware, software, and/or firmware. For example, the aggregator circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a distraction level. For example, the means for identifying a distraction level may be implemented by distraction level identifier circuitry 310. In some examples, the distraction level identifier circuitry 310 may be instantiated by processor circuitry such as the example processor circuitry 912 of FIG. 9. For instance, the distraction level identifier circuitry 310 may be instantiated by the example microprocessor 1100 of FIG. 11 executing machine executable instructions such as those implemented by at least block 440 of FIG. 4. In some examples, the distraction level identifier circuitry 310 may be instantiated by hardware logic circuitry, which may be implemented by an ASIC, XPU, or the FPGA circuitry 1200 of FIG. 12 structured to perform operations corresponding to the machine readable instructions. Additionally or alternatively, the distraction level identifier circuitry 310 may be instantiated by any other combination of hardware, software, and/or firmware. For example, the distraction level identifier circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying an attention level. For example, the means for identifying an attention level may be implemented by attention level identifier circuitry 312. In some examples, the attention level identifier circuitry 312 may be instantiated by processor circuitry such as the example processor circuitry 912 of FIG. 9. For instance, the attention level identifier circuitry 312 may be instantiated by the example microprocessor 1100 of FIG. 11 executing machine executable instructions such as those implemented by at least block 450 of FIG. 4. In some examples, the attention level identifier circuitry 312 may be instantiated by hardware logic circuitry, which may be implemented by an ASIC, XPU, or the FPGA circuitry 1200 of FIG. 12 structured to perform operations corresponding to the machine readable instructions. Additionally or alternatively, the attention level identifier circuitry 312 may be instantiated by any other combination of hardware, software, and/or firmware. For example, the attention level identifier circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for synchronizing an attention level. For example, the means for synchronizing an attention level may be implemented by synchronizer circuitry 313. In some examples, the synchronizer circuitry 313 may be instantiated by processor circuitry such as the example processor circuitry 912 of FIG. 9. For instance, the synchronizer circuitry 313 may be instantiated by the example microprocessor 1100 of FIG. 11 executing machine executable instructions such as those implemented by at least block 452 of FIG. 4. In some examples, the synchronizer circuitry 313 may be instantiated by hardware logic circuitry, which may be implemented by an ASIC, XPU, or the FPGA circuitry 1200 of FIG. 12 structured to perform operations corresponding to the machine readable instructions. Additionally or alternatively, the synchronizer circuitry 313 may be instantiated by any other combination of hardware, software, and/or firmware. For example, the synchronizer circuitry 313 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the user attention analyzing circuitry 124 of FIGS. 1 and/or 2 is illustrated in FIG. 3, one or more of the elements, processes, and/or devices illustrated in FIG. 3 may be combined, divided, re-arranged, omitted, eliminated, and/or implemented in any other way. Further, the example user device interface circuitry 301, the example user activity identifier circuitry 302, the example classifier circuitry 304, the example factor assigner circuitry 306, the example aggregator circuitry 308, the example distraction level identifier circuitry 310, the example attention level identifier circuitry 312, the example synchronizer circuitry 313, and/or, more generally, the example user attention analyzing circuitry 124 of FIG. 2, may be implemented by hardware, software, firmware, and/or any combination of hardware, software, and/or firmware. Thus, for example, any of the example user device interface circuitry 301, the example user activity identifier circuitry 302, the example classifier circuitry 304, the example factor assigner circuitry 306, the example aggregator circuitry 308, the example distraction level identifier circuitry 310, the example attention level identifier circuitry 312, the example synchronizer circuitry 313, and/or, more generally, the example user attention analyzing circuitry 124 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example user attention analyzing circuitry 124 may include one or more elements, processes, and/or devices in addition to, or instead of, those illustrated in FIG. 3, and/or may include more than one of any or all of the illustrated elements, processes and devices.

While an example manner of implementing the computing system 350 is illustrated in FIG. 3, one or more of the elements, processes and/or devices illustrated in FIG. 3 may be combined, divided, re-arranged, omitted, eliminated and/or implemented in any other way. Further, the example neural network processor 360, the example trainer 358, the example training controller 356, the example database(s) 352, 362 and/or, more generally, the example computing system 350 of FIG. 3 may be implemented by hardware, software, firmware and/or any combination of hardware, software and/or firmware. Thus, for example, any of the neural network processor 360, the example trainer 358, the example training controller 356, the example database(s) 352, 362 and/or, more generally, the example computing system 350 of FIG. 3 could be implemented by could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing system 350 of FIG. 3 may include one or more elements, processes and/or devices in addition to, or instead of, those illustrated in FIG. 3, and/or may include more than one of any or all of the illustrated elements, processes and devices.

Figure 4:
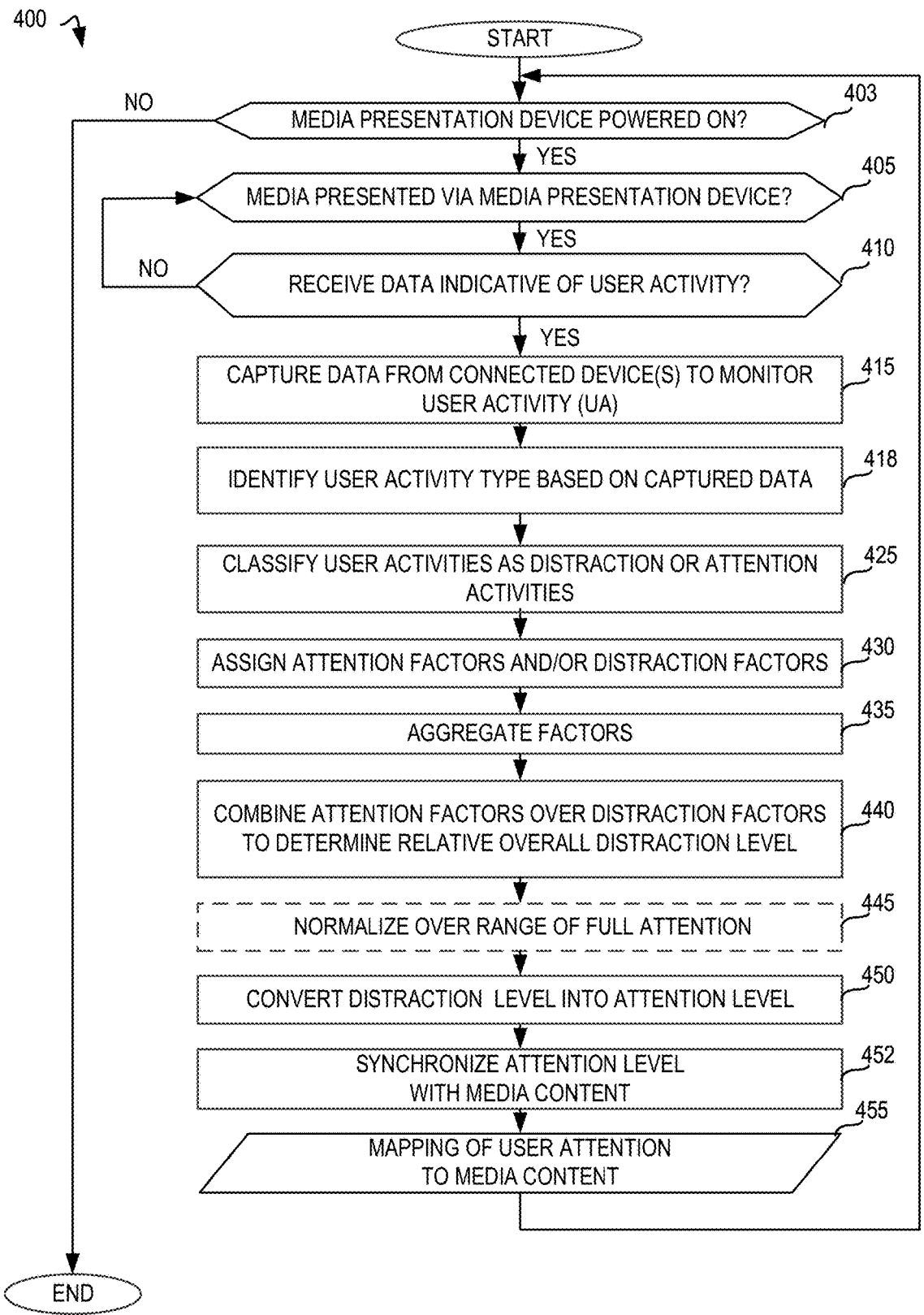
FIG. 4 is a flowchart representative of example machine readable instructions and/or example operations that may be executed by example processor circuitry to implement the user attention analyzing circuitry of FIG. 1.
Figure 5:
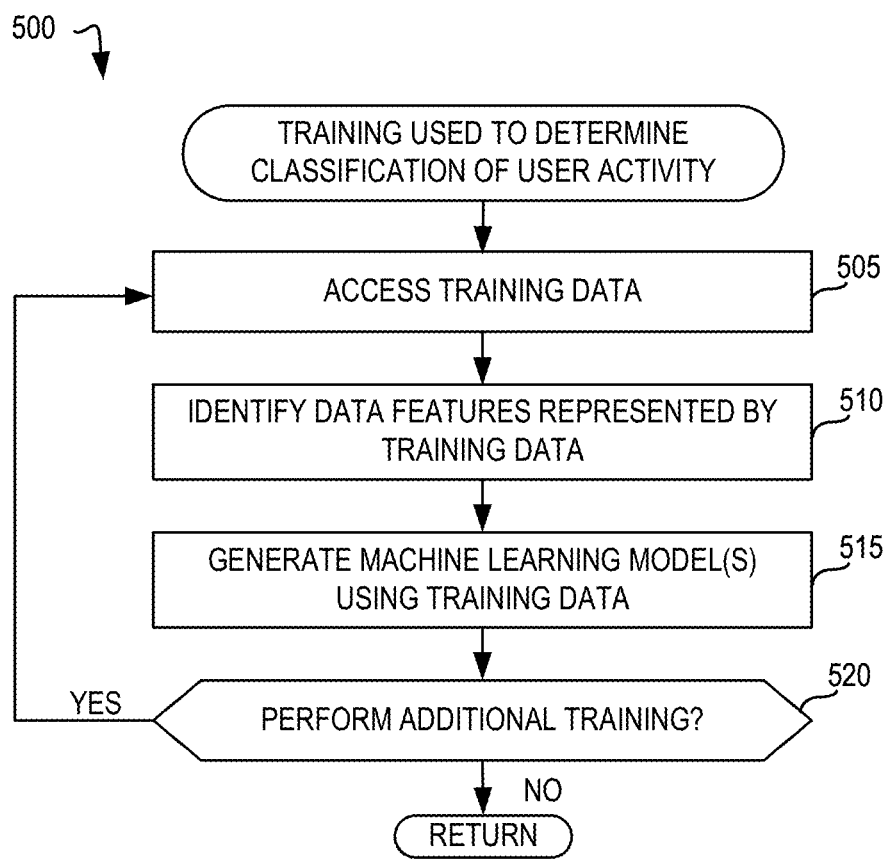
FIG. 5 is a flowchart representative of example machine readable instructions and/or operations that may be executed by example processor circuitry to train a neural network to determine a classification machine learning model.

A flowchart representative of example hardware logic circuitry, machine readable instructions, hardware implemented state machines, and/or any combination thereof for implementing the user attention analyzing circuitry 124 of FIG. 2 is shown in FIG. 4. A flowchart representative of example hardware logic, machine readable instructions, hardware implemented state machines, and/or any combination thereof for implementing the example computing system 350 of FIG. 3 is shown in FIG. 5. The machine readable instructions may be one or more executable programs or portion(s) of an executable program for execution by processor circuitry, such as the processor circuitry 812 shown in the example processor platform 900 discussed below in connection with FIG. 8, the processor circuitry 912 shown in the example processor platform 900 discussed below in connection with FIG. 9, and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) are described with reference to the flowcharts illustrated in FIGS. 4 and/or 5, many other methods of implementing the example user attention analyzing circuitry 124 of FIGS. 1 and/or 2 and/or the example computing system 350 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or operations 400 that may be executed and/or instantiated by processor circuitry to implement the example user attention analyzing circuitry 124 of FIG. 3. The machine readable instructions and/or the operations 400 of FIG. 4 begin at block 403 at which the user device interface circuitry 301 determines whether the media presentation device 119 is powered on. If the media presentation device 119 is powered on, the user device interface circuitry 301 determines if media is presented via the media presentation device 119, thereby indicative of a media session (e.g., a television session) by one or more panelists (e.g., users) (block 405). In examples in which media is being presented, the user device interface circuitry 301 determines whether data from one or more of the user devices 114, the screen status identifier circuitry 123, the image sensors 121, the motion sensors 122, the wearable devices(s) 116, and/or the remote control device 108 indicative of user activity has been received during the presentation of the media (block 410). For example, the user device interface circuitry 301 identifies input(s) from the remote control device 108 of FIG. 1. In some examples, the user device interface circuitry 301 determines whether there is any input associated with the remote control device 108 based on signals output by the remote control device 108 indicating that one or more keypresses have occurred on the remote control device 108. In some examples, the user device interface circuitry 301 receives data from the screen status identifier circuitry 123 indicative of changes in an operative state of a screen of a user's electronic device (e.g., a change in the state of a screen of the mobile device 118 from an "off" state to an "on" state). In some examples, the user device interface circuitry 301 receives data from the motions sensor(s) 122 and/or the image sensor(s) 121 in response to movement of the user(s) within the viewing area 106.

In response data received from one or more of the user devices 114, the screen status identifier circuitry 123, the image sensors 121, the motion sensors 122, the wearable devices(s) 116, and/or the remote control device 108, the user activity identifier circuitry 302 determines (e.g., predicts) the user activity based on the input data (e.g., user movement, user device usage based on an on/off screen status, remote control device usage based on a keypress, etc.) (block 418).

In the example of FIG. 4, the classifier circuitry 304 classifies the respective user activities identified by the user activity identifier 302 as a distraction-based activity or an attention-based activity (block 425). In the example of FIG. 4, the classifier circuitry 304 executes machine learning classification model(s) 364 to classify the activities however other techniques for classifying data could be used as disclosed in connection with FIG. 3. The factor assigner circuitry 306 assigns an attention factor or a distraction factor to each of the user activities classified as a distraction-based activity or an attention-based activity by the classifier circuitry 304 (block 430). In the example of FIG. 4, the aggregator circuitry 308 aggregates the attention factor(s) and/or distraction factor(s) that were identified by the factor assigner circuitry 306 (block 435). The distraction level identifier circuitry 310 combines attention factor(s) over the distraction factor(s) to determine a relative overall distraction level (e.g., DL(t)) (block 440). In some examples, the distraction level identifier circuitry 310 normalizes combination of the aggregated attention factors and the aggregated distraction factors relative to a range of full attention ($A_{FULL}$) to obtain the relative overall distraction level of a user over time (e.g., DL(t)) (block 445). In some examples, the distraction level identifier circuitry 310 determines the overall distraction level using example Equation Set 1, as disclosed in connection with FIG. 3. The attention level identifier circuitry 312 converts the distraction level into an overall attention level (e.g., AL(t)) of a panelist during a given media session (e.g., television session) (block 450).

In the example of FIG. 4, the synchronizer circuitry 313 synchronizes the identified attention level(s) over time for a given panelist with the media content presented (e.g., using the media presentation device 119) (block 452). For example, the synchronizer circuitry 313 can be used to determine an attention level of the panelist at a given point in time (e.g., during an advertisement, etc.) based on timestamps associated with the media and the corresponding attention levels. In some examples, the user attention analyzing circuitry 124 outputs a mapping of the panelist attention level to specific media content (block 455).

The example instructions 400 of FIG. 4 continue to monitor user activity when the media presentation device is powered one and presenting media (i.e., control returns to block 405). The example instructions 400 of FIG. 4 end when the media presentation device is powered off.

FIG. 5 is a flowchart representative of example machine readable instructions and/or example operations 500 that may be executed and/or instantiated by processor circuitry to cause the computer system 350 to train a neural network to generate a classification machine learning model for by, for example, the classifier circuitry 304 of FIG. 3. In the example of FIG. 5, the trainer 358 accesses training data 354 (block 505). The training data 354 can include reference data representing user activities based on sensor-based input and/or user device-based data. For example, the training data 354 can include images of users watching television, looking at a smartphone, etc. The trainer 358 identifies data features represented by the training data 354 (block 510). The training controller 356 instructs the trainer 358 to perform training of the neural network using the training data 354 to generate a classification model 364 (block 515). In some examples, additional training is performed to refine the model 364 (block 520).

FIG. 6 is a flow diagram illustrating an example process 600 for assigning distraction factors and attention factors to user activities to obtain a relative measure indicating an overall attention level during a media session (e.g., a television session) in accordance with teachings of this disclosure. In the example of FIG. 6, the user activity identifier circuitry 302 identifies user actions 605 (e.g., $UA_1(t)$, etc.). In the example of FIG. 6, $UA_1(t)$, $UA_1(t)$, $UA_J(t)$, and/or $UA_N(t)$ represent different user activities associated with a single user at different times during the media session. The user actions 605 can include movement(s) captured by the motion sensor(s) 122, usage of the remote control device 108, the laptop 115, the electronic tablet 117, and/or the smartphone 118, accelerometer data from wearable device(s) 116, etc. The classifier circuitry 304 assigns classifications 610 to each of the user activities to identify a particular user activity as an attention-based activity or a distraction-based activity (e.g., $C[UA_1(t)]$, etc.). For example, the classifier circuitry 304 assigns classifications 610 to classify an activity such as selection of a channel using the remote control device 108 as an attention-based activity and use of a smartphone 118 (as detected based on the screen state) as a distraction-based activity. The factor assigner circuitry 306 assigns a distraction factor (DF) or an attention factor (AF) 615 to the respective classified activities (e.g., $F(C)=DF_1(t)$, $F(C)=AF_1(t)$, etc.). For example, the factor assigner circuitry 306 assigns the distraction factor for active usage of the smartphone 118 and the attention factor for active usage of the remote control device 108 to the activities classified as attention-based activities and distraction-based activities.

The aggregator circuitry 304 determines an aggregate 620 of the respective ones of the distraction factor(s) and/or the attention factor(s) 615 (e.g., summation of the factor(s)). For example, the aggregator circuitry 304 sums the attention factors associated with attention-based activities to obtain an overall attention factor for the duration of the media presentation session and sums the distraction factors associated with distraction-based activities to obtain an overall distraction factor for the duration of the media presentation session. The distraction level identifier circuitry 310 combines and normalizes the aggregated attention factors and aggregated distraction factors 625 over a range of full attention ($A_{FULL}$) to obtain the relative overall distraction level (e.g., DL(t)) 630. In some examples, the distraction level identifier circuitry 310 removes user activity data and/or the corresponding attention or distraction factors associated with time periods when the media presentation device. The attention level identifier circuitry 312 converts 635 the overall distraction level to an overall attention level 640 (e.g., AL(t)) for the media session. In the example of FIG. 6, the attention level identifier circuitry 312 subtracts the distraction level from one (e.g., 1−DL(t)) given that the distraction factor(s) and attention factor(s) are normalized to a common scale (e.g., having a maximum unit of one). As such, a high distraction level (e.g., DL(t)=0.8) yields a low attention level (e.g., AT(t)=0.2) and vice versa.

Thus, in the example of FIG. 6, at a given point in time during the media presentation session, the user attention analyzing circuitry 124 determines the user's level of attention and/or distraction. As such, based on the user actions identified during the media presentation session, a cumulative assessment of the distraction factor(s) and/or attention factor(s) yields an overall attention level. For example, at a time directly following the selection of a channel using the remote control device 108, the user's attention level is higher than when the user is identified as actively using the smartphone 118 (e.g., based on screen on/off data, etc.), even if the two activities occur simultaneously (e.g., user attention is directed to the media presentation device when making the channel selection).

Figure 7A:
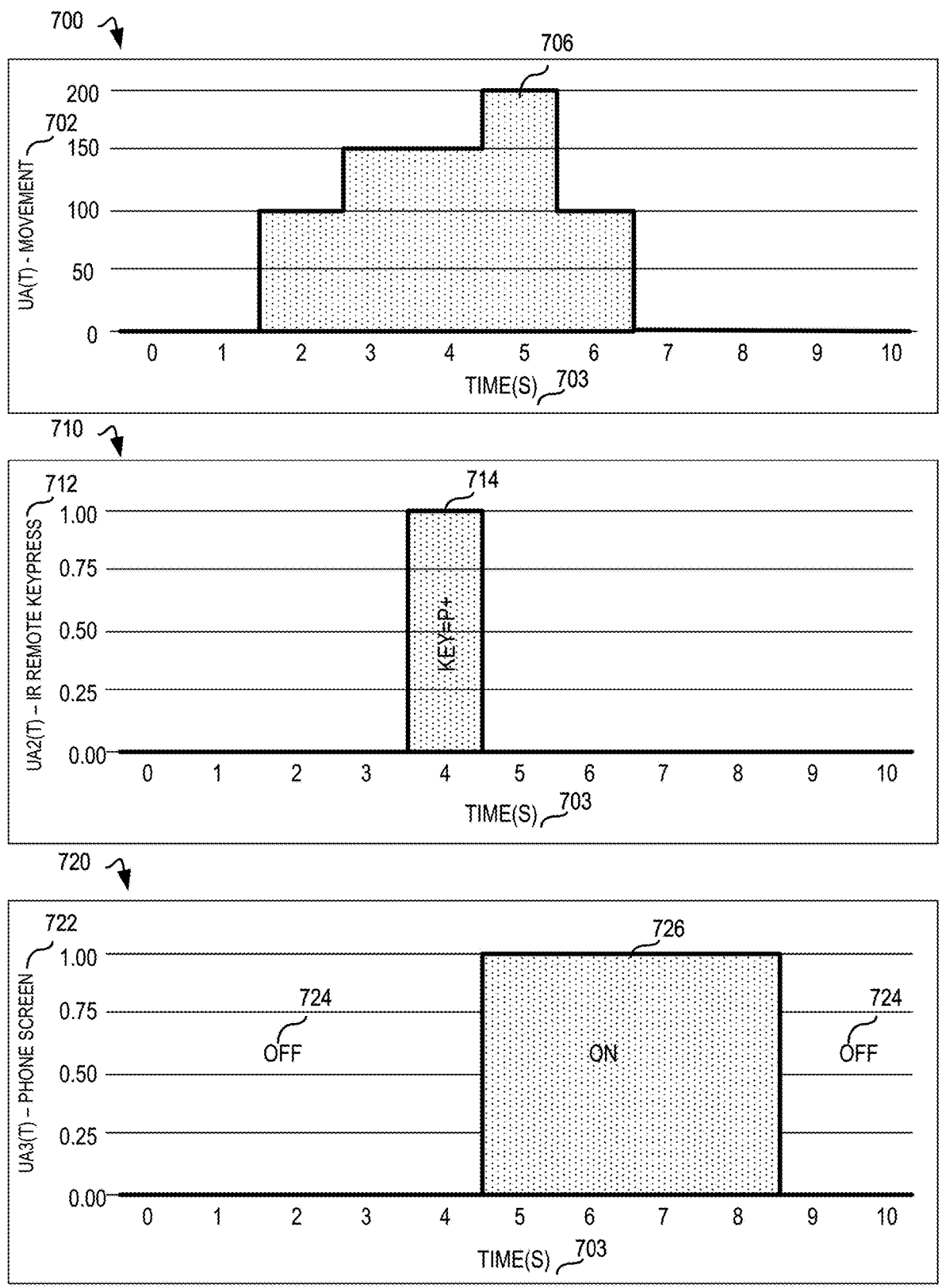
FIG. 7A includes plots illustrating graphical representations of example user activities over time.

FIG. 7A illustrates example graphical representations of different types of user activities that may be detected by the user activity identifier circuitry 302 of FIG. 3 during a media session. In the example of FIG. 7A, a first type of user activity 700 (e.g., UA1(t)) correspond to user movement over time, a second type of user activity 710 (e.g., UA2(t)) corresponds to remote control activity over time, and a third type of user activity 720 (e.g., UA3(t)) corresponds to an operative status of a screen of a user's phone over time.

In the first example of FIG. 7A, the first type of user activity 700 (e.g., UA1(t)) includes a movement of the user 702 (e.g., captured using image sensor(s) 121, motion sensor(s) 122, an accelerometer on a user's wearable user device that reports a rate of movement, etc.) over a time period 703 associated with a media viewing session. With respect to the example first type of user activity 700 of FIG. 7A, the movement is detected over a duration of five seconds with varying intensities as shown by an example graph 706 of the movement in FIG. 7A. In some examples, the intensities of movement associated with graph 706 represent a level of physical activity (e.g., an overall amount of movement, a speed with which the movement is performed, etc. which can be detected based on data from the image sensor(s) 121, the wearable device(s) 116, etc.).

In the example of FIG. 7A, the second type of user activity 710 (e.g., UA2(t)) includes activity performed using the remote control device 108 such as a keypress 712 on the remote control device 108. In the second example of FIG. 7A, the user has pressed a key on the remote control device 108 to increment a television channel (e.g., KEY=P+), as represented by an example graph 714 of the keypress. As shown in FIG. 7A, the keypress has a duration of approximately one second.

In the example of FIG. 7A, the third type of user activity 720 (e.g., UA3(t)) is associated with an operative state 722 of a screen of electronic device such as a smartphone. As disclosed herein, the operative state (e.g., an "on" state of the screen, an "off" state of the screen) can be detected based on data received from the screen status identifier circuitry 123 of the user device (e.g., a mobile device application indicating a screen on/off status). In the third example of FIG. 7A, a graph 726 illustrates that during the media viewing session over the time period 703, the user's mobile device screen was in an "off" state 724 for a time interval lasting from t=0 to approximately t=4.5, followed by an "on" state 726 (e.g., lasting approximately four seconds from t=4.5 to t=8), before returning to the "off" state 724 at t=8.5. Although the third type of user activity 720 is discussed in connection with a screen of a mobile phone, the third type of user activity 720 could apply to other types of devices (e.g., a laptop).

Figure 7B:
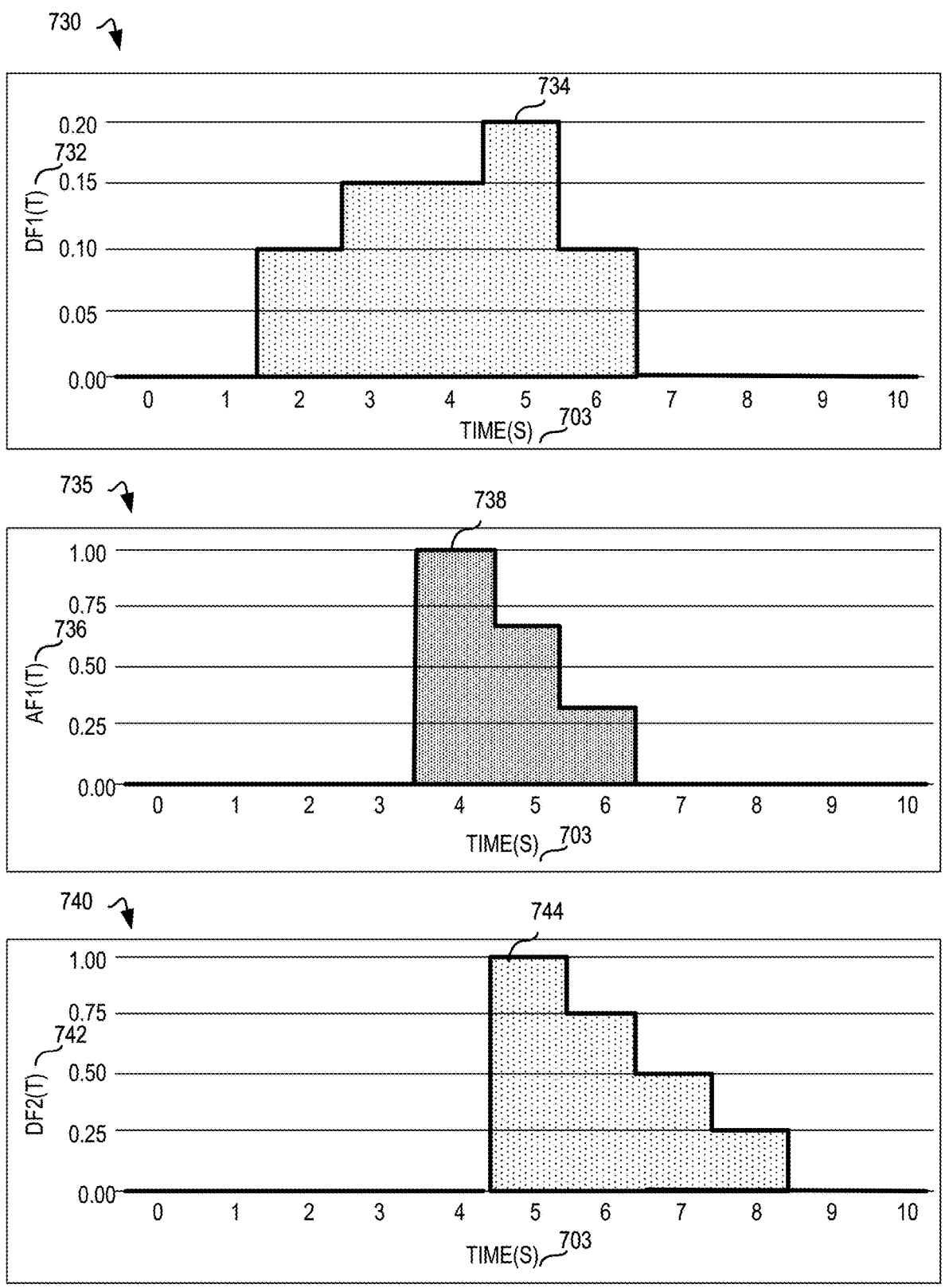
FIG. 7B includes plots illustrating graphical representations of a distraction factor or an attention factor assigned to the respective user activities of FIG. 7A.

FIG. 7B illustrates example graphical representations 730, 735, 740 of a distraction factor (DF) or an attention factor (AF) assigned to the first type of user activity 700 (UA1), the second type of user activity (UA2) 710, and the third type of user activity (UA3) 720 of FIG. 7A by the classifier circuitry 304 of FIG. 3. In the example of FIG. 7B, the first graphical representation 730 indicates that the movement associated with the first type of user activity 700 shown in the example of FIG. 7A is classified as a distraction. The factor assignor circuitry 306 assigns a distraction factor 732 (e.g., DF1(t)) to the user activity 700. The distraction factor 732 accounts for changes in the user distraction over the time period 703 as the activity (e.g., the movement) is performed. As shown in FIG. 7B, a graph 734 of the distraction factor 732 associated with user movement substantially correlates the user movement graph 706 of FIG. 7A (e.g., increasing distraction associated with greater user movement). As such, DF1(t) is proportional or substantially proportional to the movement data captured. In some examples, the distraction factor can be normalized to a maximum value (e.g., 1000) to obtain a relative scale.

In the second example of FIG. 7B, the graphical representation 735 represents the remote control device 108 usage associated with the second type of user activity 710 shown in the example of FIG. 7A. In particular, the classifier circuitry 304 classifies the remote control device usage as an attention activity. The factor assignor circuitry 306 assigns an attention factor 736 (e.g., AF1(t)) to the activity and accounts for changes in the user attention over the time period 703 when performing the activity (e.g., when using the remote control). With respect to the second type of user activity 710, the attention factor is a linearly decreasing function in relative scale (e.g., estimation of a probability of the user's focus since the event is associated with the keypress on the remote control device 108). As such, user attention is shown to be highest at the initiation of the keypress (e.g., as shown using example graph 738) and decreases over time.

In the third example of FIG. 7B, the graphical representation 740 represents mobile device usage as represented by the operative state of the screen of the device in connection with the third type of user activity 720 shown in the example of FIG. 7A. The classifier 304 classifies mobile device usage (as presented by the screen being in an "on" state) as a distraction. The factor assignor circuitry 306 assigns a distraction factor 742 (e.g., DF2(t)) to the user activity. The distraction factor accounts for changes in the user distraction over the time period 703 while interacting with the mobile phone (e.g., viewing content on the screen of the mobile phone). With respect to the third type of user activity 720, the distraction factor is a linearly decreasing function in relative scale, where the distraction is peaked when the mobile device screen is initially in the "on" state (e.g., as shown using graph 744), followed by a decrease in the distraction as the mobile device "off" screen state approaches.

Figure 7C:
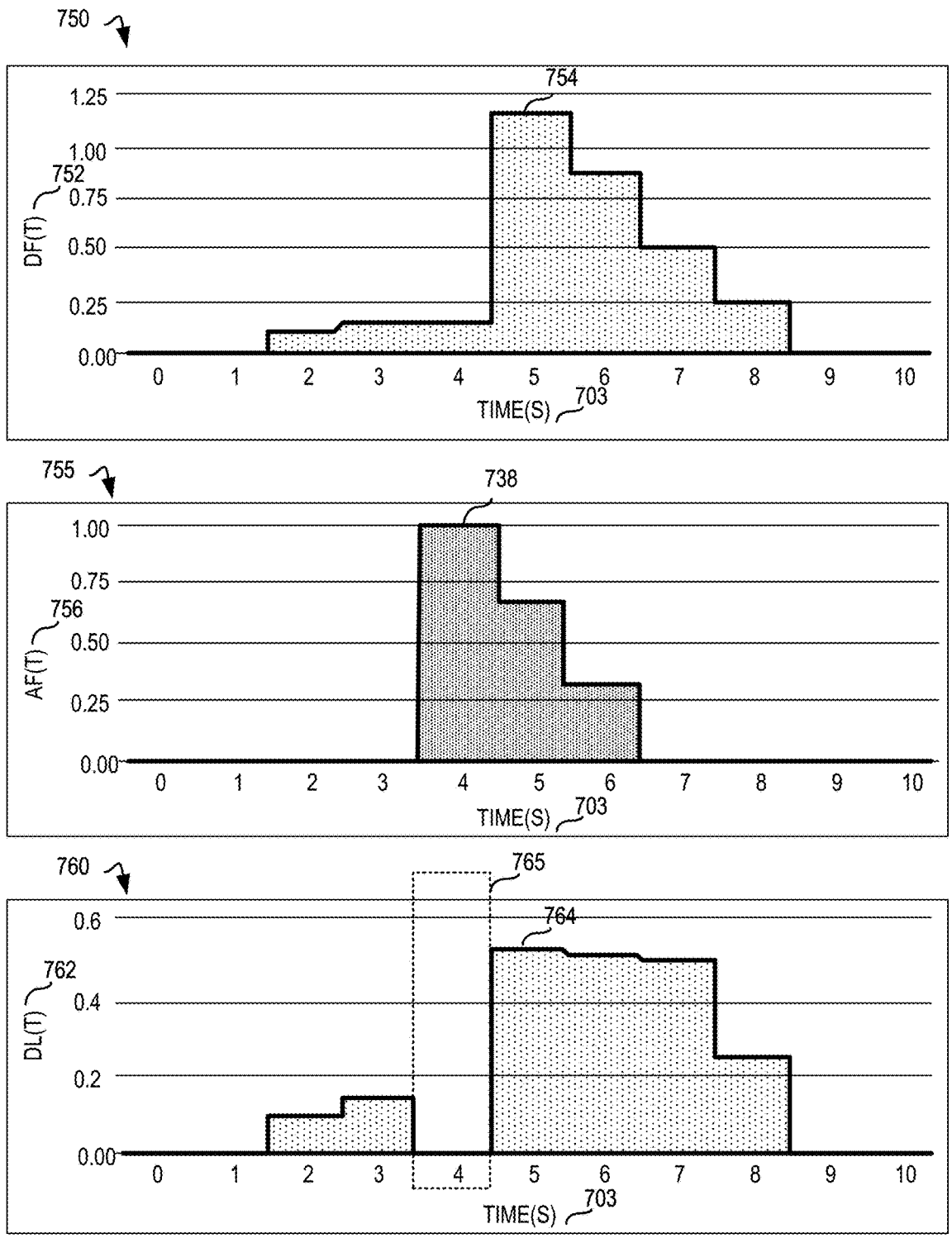
FIG. 7C includes plots illustrating graphical representations of aggregated distraction factors and aggregated attention factors and an overall distraction level for a user in connection with FIGS. 7A and 7B.

FIG. 7C illustrates example graphical representations 750, 755, 760 of aggregated distraction factors (DF) and aggregated attention factors (AF) and an overall distraction level (DL) as determined based on the respective distraction or attention factors assigned to the user activities disclosed in connection with FIGS. 7A and 7B. In the example of FIG. 7C, the aggregator circuitry 308 aggregates the distraction factors of FIG. 7B (e.g., DF1(t) 732 and DF2(t) 742) into a single distraction factor 752 (e.g., DF(t)) as shown in connection with the first graphical representation 750 of FIG. 7C. Put another way, a graph 754 of the aggregated distraction factor 752 shows a combination of the graph(s) 734 and 744 of FIG. 7B over time. For example, at t=5, the distraction factor can be calculated as follows DF(5)=DF1(5)+DF2(5)=0.20+1.00=1.20, as shown in connection with graphical representation 750.

In the second example of FIG. 7C, the graphical representation 755 of the total attention factor (AF(t)) 756 corresponds to the attention factor (AF1(t)) 738 of FIG. 7B because only one of the three user activities of FIG. 7A was classified as an attention-based user activity.

In the third example of FIG. 7C, a graphical representation 760 of an overall distraction level (DL(t)) 762 is determined based on the aggregated distraction factor(s) 752 (e.g., DF(t)) and aggregated attention factor(s) 756 (e.g., AF(t)). A graph 764 of the overall distraction level over the time period 703 (e.g., the media session or a portion thereof) shows that the distraction level is reduced, eliminated, or substantially eliminated in connection with an attention-based user activity (e.g., using the remote control device) as represented by an example region 765 in the graphical presentation 760.

Figure 7D:
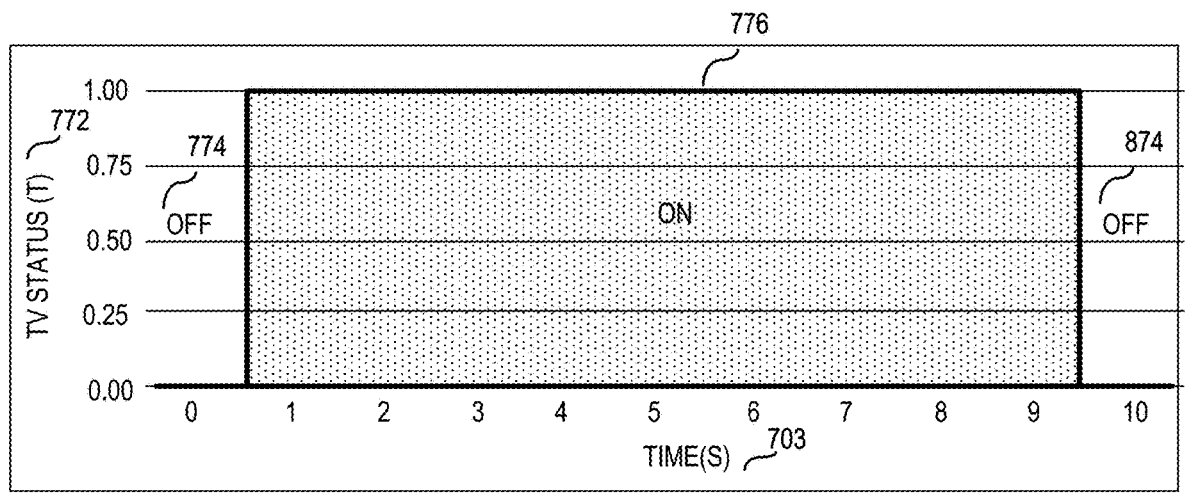
FIG. 7D includes plots illustrating graphical representations of an operational status of a media presentation device and a corresponding overall attention level for a user.
Figure 7D:
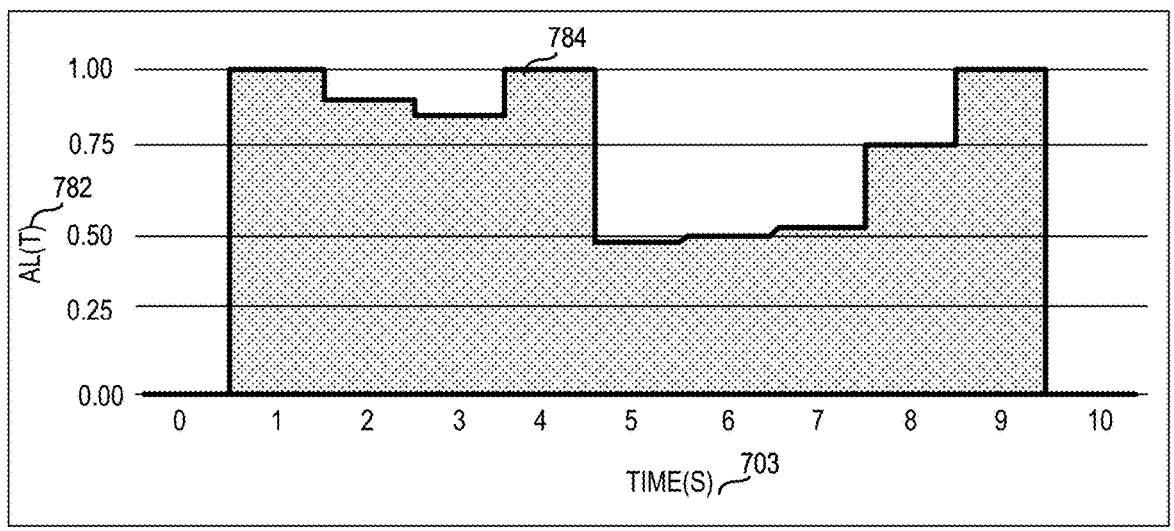

FIG. 7D illustrates example graphical representations 770, 780 of a television operative status and corresponding overall attention level (AL) of a user while media is presented via the television (e.g., the media presentation device 119 of FIG. 1). In the example of FIG. 7D, the graphical representation 770 of a television on/off status 772 can be used to determine a duration of the media viewing session (e.g., based on an "off" status 774 and/or an "on" status 776). The overall attention level(s) (e.g., AL(t)) 782 shown in connection with the graphical representation 780 can be mapped to the time period when the user was exposed to a given media viewing session. The overall attention level of the user varies over time, as shown by the graph 784. The mapping between the operative state of the television and the overall attention level(s) 782 can be used to identify particular content to which the user was likely exposed or engaged with or content presented during time(s) when the user was distracted (thereby indicating that the user may have been less engaged with the content).

Figure 8:
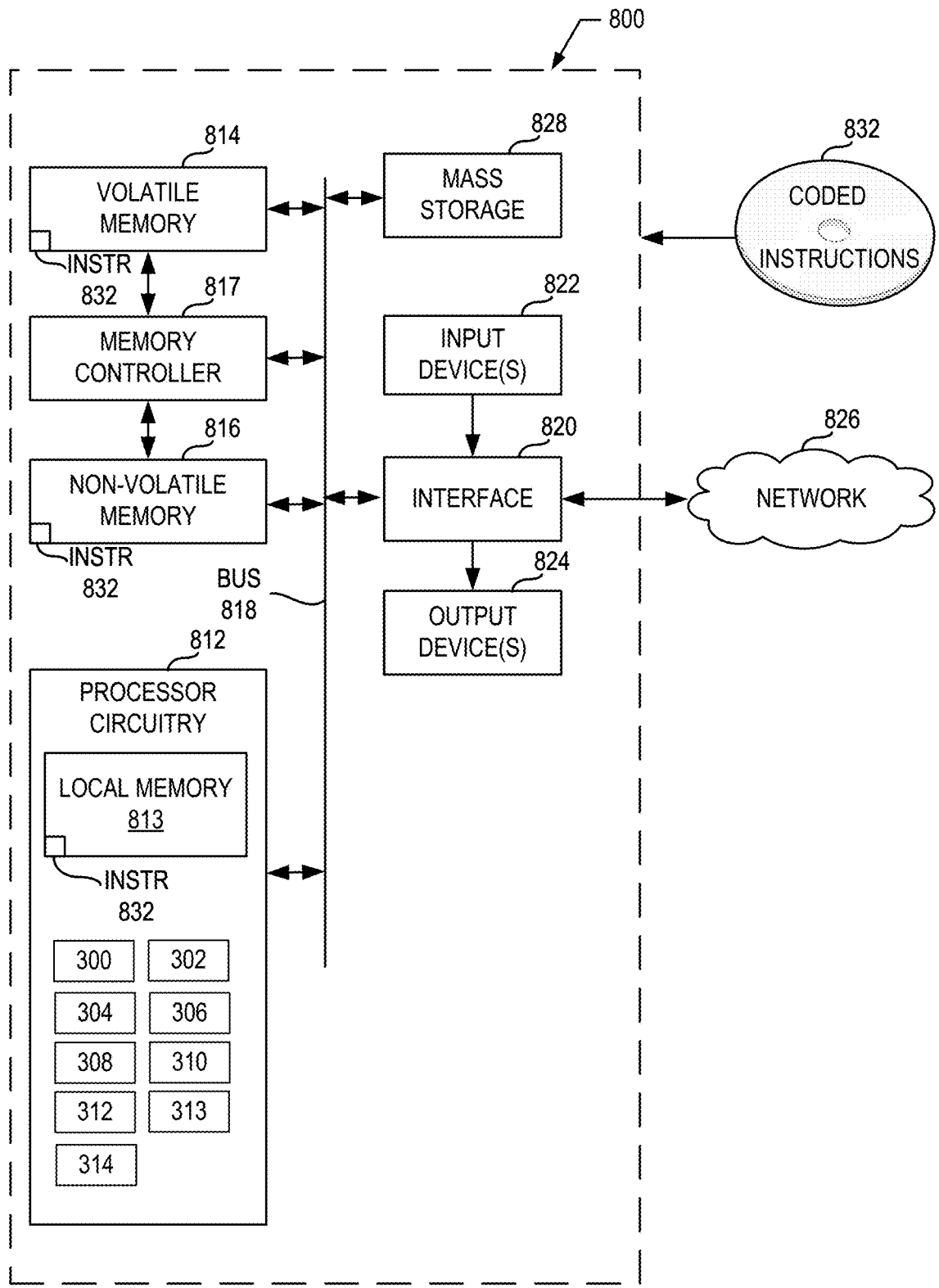
FIG. 8 is a block diagram of an example processing platform including processor circuitry structured to execute the example machine readable instructions and/or the example operations of FIG. 4 to implement the example user attention analyzing circuitry of FIG. 1.

FIG. 8 is a block diagram of an example processor platform 800 structured to execute and/or instantiate the machine readable instructions and/or operations of FIG. 4 to implement the user attention analyzing circuitry 124 of FIGS. 1-3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the user device interface circuitry 301, the user activity identifier circuitry 302, the classifier circuitry 304, the factor assigner circuitry 306, the aggregator circuitry 308, the distraction level identified circuitry 310, the attention level identifier circuitry 312, and/or the example synchronizer circuitry 313.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 4, may be stored in the mass storage device 828, in the volatile memory 814, in the non-volatile memory 816, and/or on a removable non-transitory computer readable storage medium such as a CD or DVD.

Figure 9:
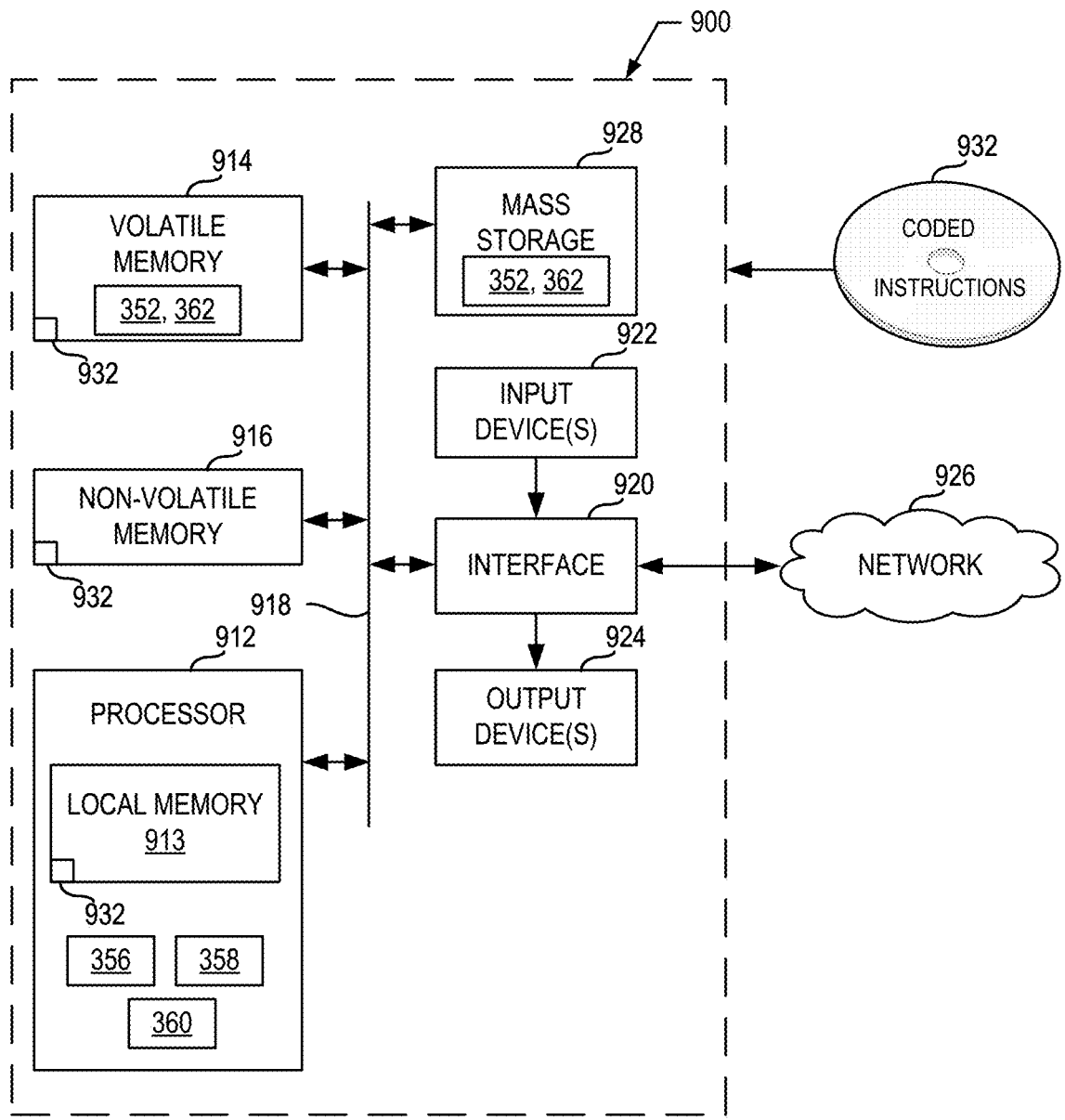
FIG. 9 is a block diagram of an example processing platform including processor circuitry structured to execute the example machine readable instructions and/or the example operations of FIG. 5 to implement the example computing system of FIG. 3.

FIG. 9 is a block diagram of an example processing platform 900 structured to execute the instructions of FIG. 5 to implement the example computing system 350 of FIG. 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 360, the example trainer 358, and the example training controller 356.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932, which may be implemented by the machine readable instructions of FIG. 5, may be stored in the mass storage device 928, in the volatile memory 914, in the non-volatile memory 916, and/or on a removable non-transitory computer readable storage medium such as a CD or DVD.

Figure 10:
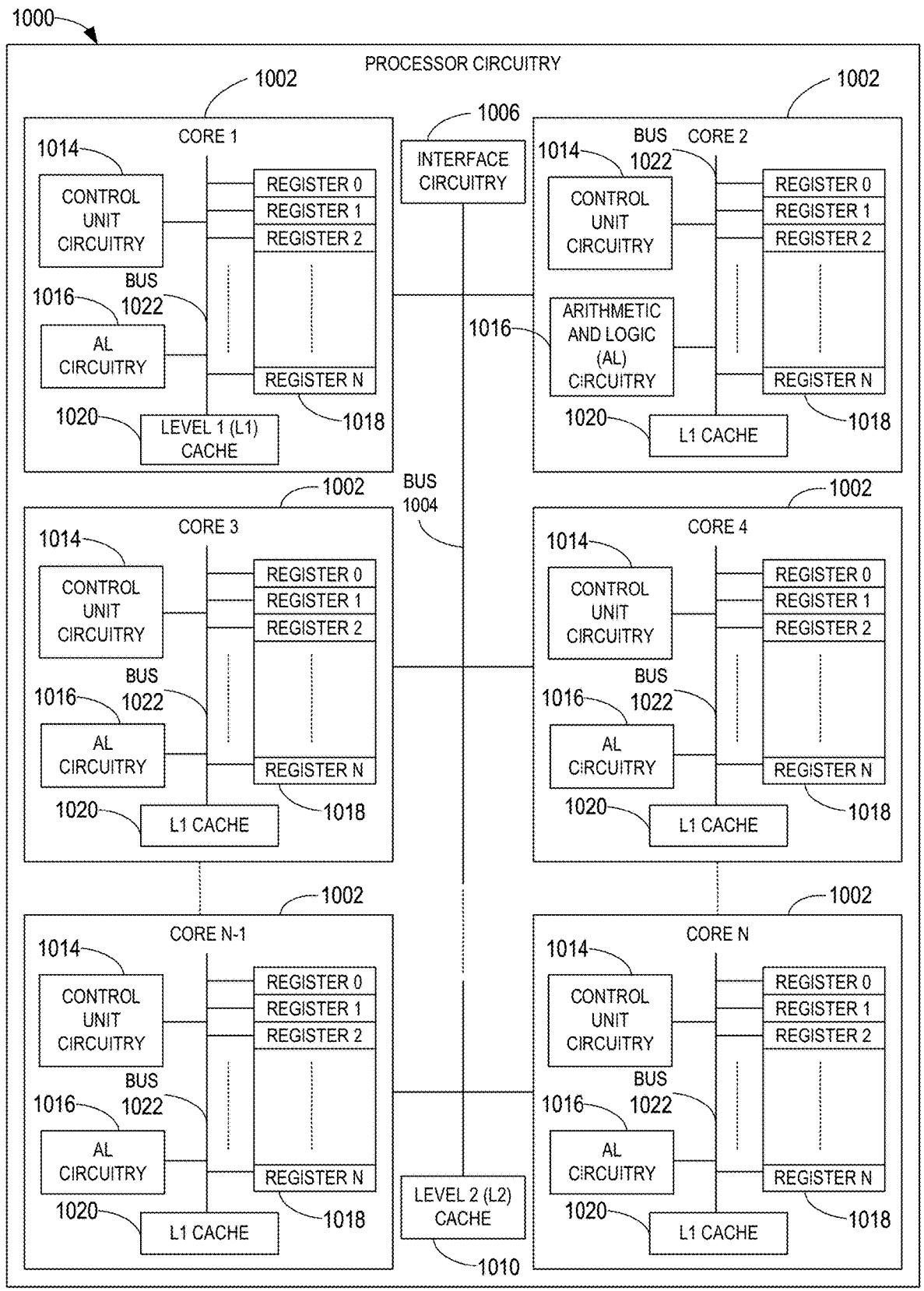
FIG. 10 is a block diagram of an example implementation of the processor circuitry of FIGS. 8 and/or 9.

FIG. 10 is a block diagram of an example implementation of the processor circuitry 812, 912 of FIGS. 8, 9. In this example, the processor circuitry 812, 912 of FIGS. 8, 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowchart of FIGS. 4 and/or 5 to effectively instantiate the circuitry of FIGS. 1, 2, and/or 3 as logic circuits to perform the operations corresponding to those machine readable instructions. In some such examples, the circuitry of FIGS. 1, 2, and/or 3 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4 and/or 5.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 814, 816 of FIG. 8, the main memory 914, 16 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer-based operations. In other examples, the AL circuitry 1016 also performs floating point operations. In yet other examples, the AL circuitry 1016 may include first AL circuitry that performs integer-based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
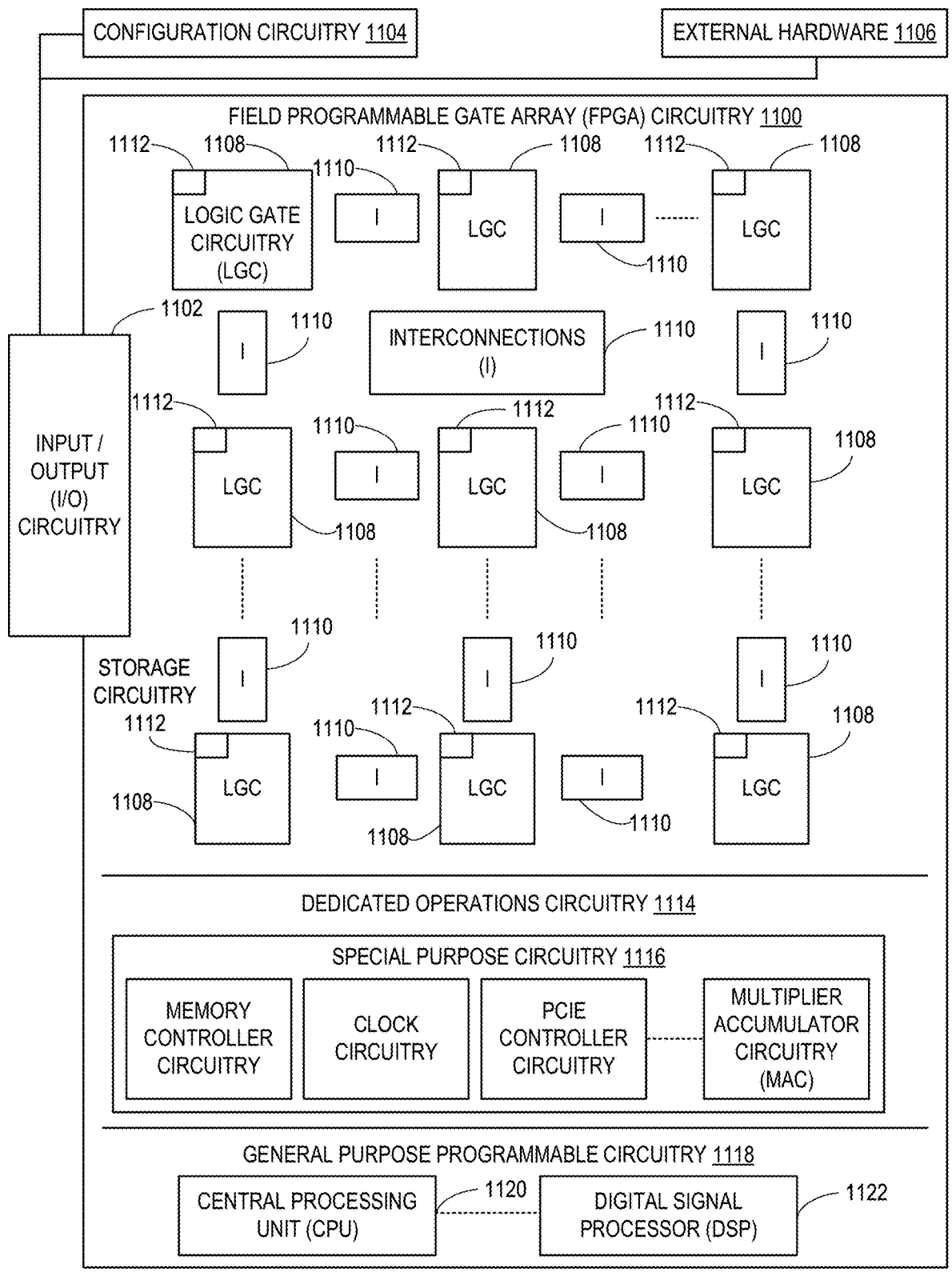
FIG. 11 is a block diagram of another example implementation of the processor circuitry of FIGS. 8 and/or 9.

FIG. 11 is a block diagram of another example implementation of the processor circuitry 812, 912 of FIGS. 8, 9. In this example, the processor circuitry 812, 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 4 and/or 5 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIGS. 4 and/or 5. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 4 and/or 5. As such, the FPGA circuitry 1100 may be structured to effectively instantiate some or all of the machine readable instructions of the flowcharts of FIGS. 4 and/or 5 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4 and/or 6 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1100 of FIG. 11. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 4 and/or 5 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 812, 912 of FIGS. 8 and/or 9, many other approaches are contemplated. For example, as mentioned above, modern FPGA circuitry may include an on-board CPU, such as one or more of the example CPU 1120 of FIG. 11. Therefore, the processor circuitry 812, 912 of FIGS. 8 and/or 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIGS. 4 and/or 5 may be executed by one or more of the cores 1002 of FIG. 10, a second portion of the machine readable instructions represented by the flowcharts of FIGS. 4 and/or 5 may be executed by the FPGA circuitry 1100 of FIG. 11, and/or a third portion of the machine readable instructions represented by the flowcharts of FIGS. 4 and/or 5 may be executed by an ASIC. It should be understood that some or all of the circuitry of FIGS. 9, 10, 11 may, thus, be instantiated at the same or different times. Some or all of the circuitry may be instantiated, for example, in one or more threads executing concurrently and/or in series. Moreover, in some examples, some or all of the circuitry of FIGS. 9, 10, 11 may be implemented within one or more virtual machines and/or containers executing on the microprocessor.

In some examples, the processor circuitry 912, 1012, 1112 of FIGS. 9, 10, 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 912, 1012, 1112 of FIGS. 9, 10, 11 which may be in one or more packages. For example, the XPU may include a CPU in one package, a DSP in another package, a GPU in yet another package, and an FPGA in still yet another package.

Figure 12:
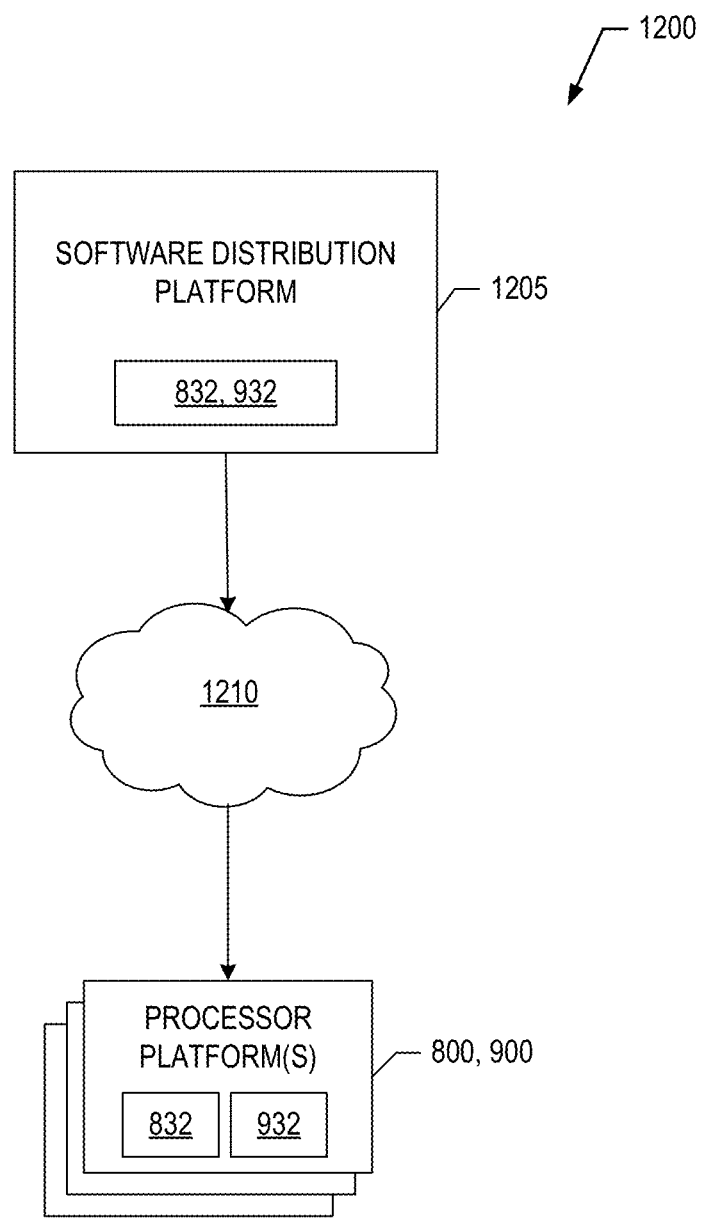
FIG. 12 is a block diagram of an example software distribution platform (e.g., one or more servers) to distribute software (e.g., software corresponding to the example machine readable instructions of FIGS. 4 and/or 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 832, 932 of FIGS. 8 and/or 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 832, 932 of FIGS. 8 and/or 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 832, 932 of FIGS. 8 and/or 9, which may correspond to the example machine readable instructions 400 and/or 500 of FIGS. 4 and/or 5, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832, 932 from the software distribution platform 1205. For example, the software, which may correspond to the example machine readable instructions 400 and/or 500 of FIGS. 4 and/or 5 may be downloaded to the example processor platform 800, 900 which is to execute the machine readable instructions 832, 932 to implement the user attention analyzing circuitry 124. In some example, one or more servers of the software distribution platform 1205 periodically offer, transmit, and/or force updates to the software (e.g., the example machine readable instructions 832, 932 of FIGS. 8, 9) to ensure improvements, patches, updates, etc., are distributed and applied to the software at the end user devices.

From the foregoing, it will be appreciated that example systems, methods, and apparatus disclosed herein provide for determination (e.g., prediction, estimation) of audience exposure to media based on engagement level. Examples disclosed herein identify changes in a panelist's engagement with media content over time based on any analysis of user activities performed over the media presentation session (e.g., a television session). In some examples, user activity can be determined (e.g., identified, predicted) based on inputs from, for instance, remote controls, motion sensors, mobile phones, tablets, biometric wearables, etc. that collect data indicative of user activities during the given media viewing event. Some examples disclosed herein apply distraction factors based on varying impacts to user attention when a user is performing different activities (e.g., user movement, user remote control usage, user mobile phone usage, etc.). Distraction factors and/or attention factors can be assigned to user activities detected over time during presentation of the media (e.g., a first detected user activity, a second detected user activity, etc.) to obtain a relative measure indicating an overall attention level associated with a given media viewing session (e.g., television session, etc.).

Example methods, apparatus, systems, and articles of manufacture to estimate audience exposure based on engagement level are disclosed herein. Further examples and combinations thereof include the following:

Example 1 includes an apparatus, comprising at least one memory, machine readable instructions, and processor circuitry to at least one of instantiate or execute the machine readable instructions to identify a user activity associated with a user during exposure of the user to media based on an output from at least one of a user device, a remote control device, an image sensor, or a motion sensor, classify the user activity as an attention-based activity or a distraction-based activity, assign a distraction factor or an attention factor to the user activity based on the classification, and determine an attention level for the user based on the distraction factor or the attention factor.

Example 2 includes the apparatus of example 1, wherein the user activity is a first user activity and the processor circuitry is to identify a second user activity by the user during the exposure of the user to the media, assign a distraction factor or an attention factor to the second user activity, and determine the attention level based on (a) the assigned distraction factor or attention factor for the first user activity and (b) the assigned distraction factor or attention factor for the second user activity.

Example 3 includes the apparatus of example 2, wherein the processor circuitry is to assign the distraction factor to the first user activity and the attention factor to the second user activity, the processor circuitry to determine a distraction level for the user based on the distraction factor and the attention factor, and determine the attention level based on the distraction level.

Example 4 includes the apparatus of example 2, wherein the processor circuitry is to assign the attention factor to the first user activity and the attention factor to the second user activity, the processor circuitry to aggregate the attention factor for first user activity and the attention factor for the second user activity, and determine the attention level based on the aggregation of the attention factors.

Example 5 includes the apparatus of example 1, wherein the processor circuitry is to determine an estimated level of impact of the user activity on the attention level of the user over time based on the assigned distraction factor or the assigned attention factor.

Example 6 includes the apparatus of example 1, wherein the processor circuitry is to identify the user activity based on an operative state of the user device.

Example 7 includes a non-transitory machine readable storage medium comprising instructions that, when executed, cause processor circuitry to at least identify a first user activity and a second user activity associated with a user during a media presentation session, assign a first distraction factor to the first user activity, assign a second distraction factor to the second user activity, generate an aggregated distraction factor based on the first distraction factor and the second distraction factor, and determine an attention level associated with the user during the media presentation session based on the aggregated distraction factor.

Example 8 includes the non-transitory machine readable storage medium of example 7, wherein the instructions, when executed, cause the processor to identify the first user activity based on an output from at least one of a user device, a remote control device, an image sensor, or a motion sensor.

Example 9 includes the non-transitory machine readable storage medium of example 7, wherein the instructions, when executed, cause the processor to execute a machine learning model to classify the user activity as a distraction-based activity.

Example 10 includes the non-transitory machine readable storage medium of example 7, wherein the instructions, when executed, cause the processor to time-synchronize the attention level with media content associated with the media presentation session.

Example 11 includes the non-transitory machine readable storage medium of example 10, wherein the instructions, when executed, cause the processor to generate a mapping of the attention level to the media content of the media session.

Example 12 includes the non-transitory machine readable storage medium of example 7, wherein the instructions, when executed, cause the processor to identify the first user activity based on an output of a wearable device indicative of movement by the user.

Example 13 includes the non-transitory machine readable storage medium of example 7, wherein the instructions, when executed, cause the processor to identify a third user activity associated with the user during the media presentation session, assign an attention factor to the third user activity, and determine the attention level based on the aggregated distraction factor and the attention factor.

Example 14 includes an apparatus, comprising means for identifying a first user activity associated with a user during presentation of media by a media presentation device, means for classifying the first user activity as an attention-based activity or a distraction-based activity, means for assigning a distraction factor or an attention factor based on the classification, means for aggregating the assigned distraction factor or the assigned attention factor for the first user activity with a corresponding one of an assigned distraction factor or assigned attention factor for a second user activity during the presentation of the media, and means for identifying an attention level of the user based on the aggregated distraction factors or the aggregated attention factors.

Example 15 includes the apparatus of example 14, wherein the means for identifying the first user activity is to identify the first user activity based on an output from at least one of a user device, a remote control device, an image sensor, or a motion sensor.

Example 16 includes the apparatus of example 15, wherein the output from the user device is indicative of an operative state of a screen of the user device, and the means for identifying is to identify the first user activity based on the operative state of the screen.

Example 17 includes the apparatus of example 16, wherein the means for classifying is to classify the first user activity as a distraction-based activity when the operative state is a first operative state and as an attention-based activity when the operative state of the screen is a second operative state different from the first operative state.

Example 18 includes the apparatus of example 14, wherein the means for identifying is to determine an estimated level of impact of the user activity on the attention level of the user over time based on the assigned distraction factor or the assigned attention factor.

Example 19 includes the apparatus of example 15, wherein the user device is a wearable device and the output is indicative of user activity in an environment including the media presentation device, the user activity associated with at least one of movement or audio generated by the user.

Example 20 includes the apparatus of example 14, further including means for synchronizing the attention level with the media over time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting movement of a user using a motion sensor, wherein the detected movement of the user is indicative of user-activity associated with the user during exposure of the user to media content;
   obtaining an image of the user in a media viewing area from an image sensor while the media content is being presented on a media presentation device, wherein obtaining the image of the user occurs in response to a detection of movement,
   detecting the user-activity in the image using a trained classification model;
   determining, using the trained classification model, that the user-activity is an attention-based activity, wherein the attention-based activity is indicative that the user is interacting with the media presentation device;
   determining an attention level using an attention-level factor associated with the attention-based activity; and
   outputting the attention level of the user for the media content.

2. The method of claim 1, wherein the image is a first image, wherein the first image is obtained at a first time, and further comprising:
   obtaining a second image of the user in the media viewing area from the image sensor while the media content is being presented on the media presentation device at a second time, wherein the second time occurs after the first time;
   detecting another user-activity in the second image using the trained classification model;
   determining that the user-activity is a distraction-based activity; and
   wherein the determining the attention level further comprises using the attention-level factor associated with the attention-based activity at the first time and a distraction-level factor associated with the distraction-based activity at the second time.

3. The method of claim 1, further comprising:
   training, by a computer, the classification model based on input data, wherein the input data is reference data representing user activities based on sensor-based input.

4. The method of claim 3, wherein the classification model is a neural network, and wherein the reference data are at least one of: image data, video data, or sensor-input based data.

5. The method of claim 1, wherein the image sensor is remote from the user.

6. The method of claim 5, wherein the image sensor is a component of a metering device.

7. A method comprising:
   detecting movement of a user using a motion sensor, wherein the detected movement of the user is indicative of user-activity associated with the user during exposure of the user to media content;
   obtaining video data of a user in a media viewing area from a camera while the media content is being presented on a media presentation device, wherein obtaining the video data of the user occurs in response to a detection of movement;
   detecting the user-activity in the video data using a trained classification model;
   determining that the user-activity is an attention-based activity wherein the attention-based activity is indicative that the user is interacting with the media presentation device;
   determining an attention level using an attention-level factor associated with the attention-based activity; and
   outputting the attention level of the user for the media content.

8. The method of claim 7, wherein the camera is remote from the user.

9. The method of claim 7, wherein the video data is a first video data, wherein the first video data is obtained at a first time; and the method further comprising:
   obtaining a second video data of the user in the media viewing area from the camera while the media content is being presented on the media presentation device at a second time, wherein the second time occurs after the first time;
   detecting another user-activity in the second video data using the trained classification model;
   determining that the user-activity is a distraction-based activity; and
   wherein the determining the attention level further comprises using the attention-level factor associated with the attention-based activity at the first time and a distraction-level factor associated with the distraction-based activity at the second time.

10. The method of claim 7, further comprising:
training, by a computer, the classification model based on input data, wherein the input data is reference data representing user activities based on sensor-based input.

11. The method of claim 10, wherein the classification model is a neural network, and wherein the reference data are at least one of: image data, video data, or sensor-input based data.

12. A computing system comprising:
a camera;
a motion sensor;
a processor; and
a non-transitory computer-readable storage medium, having stored thereon program instructions that, upon execution by the processor, cause performance of a set of operations comprising:
  detecting movement of a user in a media viewing area using the motion sensor, wherein the detected movement of the user is indicative of user-activity associated with the user during exposure of the user to media content;
  obtaining, in response to a detection of movement, at least one of image data or video data of the user from the camera while the media content is being presented on a media presentation device;
  detecting the user-activity in the at least one of the image data or the video data using a trained classification model;
  determining that the user-activity is an attention-based activity, wherein the attention-based activity is indicative that the user is interacting with the media presentation device;
  determining an attention level using an attention-level factor associated with the attention-based activity; and
  outputting the attention level of the user for the media content.

13. The computing system of claim 12, wherein the at least one of the image data or the video data is an at least one of a first image data or a first video data, wherein the at least one of the first image data or the first video data is obtained at a first time, and the set of operations further comprising:
  obtaining at least one of second image data or second video data of the user in the media viewing area from the camera while the media content is being presented on the media presentation device at a second time, wherein the second time occurs after the first time;
  detecting another user-activity in the at least one of the second image data or the second video data using the trained classification model;
  determining that the user-activity is a distraction-based activity; and
  wherein the determining the attention level further comprises using the attention-level factor associated with the attention-based activity at the first time and a distraction-level factor associated with the distraction-based activity at the second time.

14. The computing system of claim 12, the set of operations further comprising: determining an operative state of the media presentation device as being an ON-state.

15. The computing system of claim 12, wherein the camera is remote from the user.

16. The computing system of claim 12, wherein the camera is a component of a metering device.

17. The computing system of claim 12, the set of operations further comprising:
training, by a computer, the classification model based on input data, wherein the input data is reference data representing user activities based on sensor-based input.

18. The computing system of claim 17, wherein the classification model is a neural network, and wherein the reference data are at least one of: image data, video data, or sensor-input based data.

* * * * *